(12) United States Patent
Umeyama et al.

(10) Patent No.: US 10,340,499 B2
(45) Date of Patent: Jul. 2, 2019

(54) SEALED SECONDARY BATTERY

(75) Inventors: Hiroya Umeyama, Okazaki (JP);
Hiroaki Imanishi, Moriguchi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 1029 days.

(21) Appl. No.: 14/421,169

(22) PCT Filed: Aug. 27, 2012

(86) PCT No.: PCT/JP2012/071570
§ 371 (c)(1),
(2), (4) Date: Nov. 6, 2015

(87) PCT Pub. No.: WO2014/033806
PCT Pub. Date: Mar. 6, 2014

(65) Prior Publication Data
US 2016/0072119 A1    Mar. 10, 2016

(51) Int. Cl.
*H01M 2/34* (2006.01)
*H01M 2/12* (2006.01)

(52) U.S. Cl.
CPC ......... *H01M 2/345* (2013.01); *H01M 2/1241* (2013.01); *H01M 2200/20* (2013.01); *H01M 2220/20* (2013.01)

(58) Field of Classification Search
CPC .......................... H01M 2/1241; H01M 2/345
See application file for complete search history.

(56) References Cited

FOREIGN PATENT DOCUMENTS

JP    2010-272389 A    12/2010
JP    2012-028008 A    2/2012

*Primary Examiner* — Barbara L Gilliam
*Assistant Examiner* — Nathanael T Zemui
(74) *Attorney, Agent, or Firm* — Sughrue Mion, PLLC

(57) ABSTRACT

This invention provides a sealed secondary battery comprising a current cutoff mechanism. The current cutoff mechanism has a current breaking valve 30 comprising a sloped side wall 32A which tapers with decreasing diameter from the inner circumference of a flange 32 and a dome 32B descending in a spherical cap shape from the rim of sloped side wall 32A. The rotation axis L of sloped side wall 32A and the sloped side wall 32A form an angle θ to satisfy 60°≤θ≤75° while dome 32B has a sphere radius R of 30 mm or larger, but smaller than 100 mm. In a planer view along the rotation axis L, the outer circumference of dome 32B is located outside the outer circumference of a thin portion 76.

8 Claims, 13 Drawing Sheets

SEALED SECONDARY BATTERY

CROSS REFERENCE TO RELATED APPLICATIONS

This application is a National Stage of International Application No. PCT/JP2012/071570 filed Aug. 27, 2012, the contents of all of which are incorporated herein by reference in their entirety.

TECHNICAL FIELD

The present invention relates to a sealed secondary battery. In particular, it relates to a sealed secondary battery comprising a current cutoff mechanism actuated by an increase in the internal pressure.

BACKGROUND ART

Secondary batteries such as lithium secondary batteries and nickel-hydrogen batteries are preferably used as so-called portable power supplies in personal computers, mobile devices, etc., or as vehicle-driving power supplies. In particular, lithium secondary batteries that are lightweight and have high energy densities have become increasingly important as high output power supplies for use on vehicles such as electric automobiles, hybrid mobiles and the like (e.g. as power sources to drive motors connected to drive wheels of vehicles).

Typical examples of such secondary batteries include a hermetic battery (sealed secondary battery) obtainable by sealing an electrode unit having a positive electrode and a negative electrode along with an electrolyte in a battery case. When charging this type of battery, in the presence of a defect in the battery or when a malfunction is caused by a charger failure, the electrode unit may be supplied with a higher current than usual and fall in an overcharged state. Upon the occurrence of such an overcharged state, the battery reaction rapidly proceeds and the electrolyte solution in the battery undergoes decomposition at an accelerating rate to produce a large amount of gas. This may increase the internal pressure (gas pressure) of the battery case and cause deformation of the battery case.

To prevent such undesirable effects caused by overcharging of a sealed secondary battery, it has been suggested to arrange a current cutoff mechanism in a conductive path in the battery, with the mechanism comprising a member (so-called "current breaking valve") that deforms when a certain minimum pressure is applied thereto. In a sealed secondary battery comprising such a current cutoff mechanism, when overcharging causes an internal pressure rise, the current breaking valve deforms to cutoff the conductive path in the battery. Technical literatures related to sealed secondary batteries comprising current cutoff mechanisms include Patent Documents 1 and 2.

CITATION LIST

Patent Literature

[Patent Document 1] Japanese Patent Application Publication No. 2012-028008
[Patent Document 2] Japanese Patent Application Publication No. 2010-272389

SUMMARY OF INVENTION

Technical Problem

Suitable actuation of a current cutoff mechanism at the occurrence of overcharging requires suitable deformation of the current breaking valve in response to an increase in the internal pressure of the case. In particular, for a large battery such as those installed in vehicles, as the battery case has a large internal space, a larger amount of gas tends to be required to increase the battery's internal pressure to actuate the current cutoff mechanism at a suitable timing. As a method for generating a necessary amount of gas at a right time, an overcharge additive may be added to the electrolyte solution in advance so as to generate gas when overcharged. However, depending on the amount used, etc., addition of an overcharge additive may cause undesirable effects, such as increased resource costs or reduction of battery performance.

The inventors thought that the larger the surface area of current breaking valve (i.e. surface area of the deformable portion (concavity) of current breaking valve, or "pressure-receiving area" hereinafter) to which the battery's internal pressure is applied, the lower the battery's internal pressure (or "actuation pressure" hereinafter) required to deform the current breaking valve; and studied current breaking valves having various constitutions. The details of the studies by the inventors will be discussed below.

Being an example of conventional current cutoff mechanisms, a current cutoff mechanism 180 shown in FIG. 21 comprises a current breaking valve 130 and a current collector 170. In current breaking valve 130, there is formed a concavity 132 having a conical frustum (tapered) shape protruding from a flat flange 134 to current collector 170. On the other hand, in current collector 170, there is formed a thin portion 176 having a smaller thickness than the surrounding. In current cutoff mechanism 180 having such a constitution, the bottom face 132A of concavity 132 in current breaking valve 130 is welded to the thin portion 176 in current collector 170.

One way to increase the pressure-receiving area in current breaking valve 130 thus constituted may be to increase the surface area (diameter D2) of the bottom face 132A of conical frustum-shaped concavity 132. However, with the conical frustum-shaped concavity 132, when the diameter D2 of the bottom face 132A is larger than the diameter D1 of the thin portion 176, inconveniences in manufacture may be caused. In particular, constructing current cutoff mechanism 180 includes a step of welding while pushing the thin portion 176 onto the bottom face 132A and maintaining suitable contact between the thin portion 176 and bottom face 132A. When the diameter D2 of the bottom face 132A is larger than the diameter D1 of the thin portion 176, the bottom face 132A is caused to make contact with a thick portion 178 in current collector 170, making it difficult to suitably perform the pushing with the thin portion 176. This may lead to form a space between the bottom face 132A and thin portion 176, which may cause a defective welding, due to formation of a slope or unevenness in the bottom face 132A or thin portion 176, or deflection in the thin portion 176 caused by the pushing. In addition, since the thin portion 176 is formed generally by partially press working a current collector plate, it is difficult to increase the diameter D1 of the thin portion 176 while securing the strength of current collector 170 and the thin portion 176.

In a general current cutoff mechanism, in order to assuredly cut off conduction between flange 134 and current collector 170 upon inversion of concavity 132, it is necessary to reserve a rather large height H2 from the inner periphery of flange 134 to current collector 170 (typically at least about 0.8 mm). To increase the diameter D2 of the bottom face 132A while reserving such a height H2, it is necessary to decrease the slope angle θ of concavity 132 (i.e. allow the conical frustum-shaped concavity 132 to assume a more cylindrical shape). However, in this case, as concavity 132 becomes more cylindrical, the entire concavity 132 becomes more rigid and the actuation pressure is raised.

A current cutoff mechanism 280 shown in FIG. 22 is another example of conventional current cutoff mechanisms, constituted with a current breaking valve 230 in an embodiment where a spherical cap-shaped concavity 232 protrudes from the inner circumference of a flange 234 to a current collector 270. With current cutoff mechanism 280 having such a spherical cap-shaped concavity 232, by increasing the sphere radius R of concavity 232, the pressure-receiving area can be enlarged.

On the contrary, for structural reasons associated with the entire battery, flange 234 is limited in the size; and therefore, in order to allow a suitable contact between the concavity 232 and thin portion 276 while having a large sphere radius R of spherical cap-shaped concavity 232, it is necessary to decrease the height H2 from the inner circumference of flange 234 to current collector 270. In this case, it will be difficult to reserve a height H2 (typically, at least about 0.8 mm) enough to assuredly cut off conduction between current breaking valve 230 and current collector 270 upon inversion of concavity 232.

On the other hand, a smaller sphere radius R of concavity 232 to reserve the height H2 yields a decrease in the pressure-receiving area, and, in addition, tends to increase the rigidity of concavity 232. Moreover, since the cap top of concavity 232 has a smaller curvature, current collector 270 being pushed thereon may cause damage, etc., to the thin portion 276, leading to a decrease in the yield rate of battery production. The smaller curvature of concavity 232 may also result in a decrease in the contact area between the concavity 232 and thin portion 276.

In view of such circumstances, the present invention provides a sealed secondary battery comprising a current cutoff mechanism that can be set to actuate at a low pressure, with the battery being capable of avoiding the undesirable effects as described above.

Solution to Problem

To realize the objective, the present invention provides a sealed secondary battery having a constitution described below.

The sealed secondary battery disclosed herein comprises an electrode unit as a power generator having a positive electrode and a negative electrode, a battery case housing the electrode unit, an electrode terminal electrically connected to the electrode unit, and a current cutoff mechanism (current interrupt device) that is arranged in a conductive path between the electrode unit and the electrode terminal to cutoff the conductive path when a pressure rise occurs inside the battery case. The current cutoff mechanism comprises a current collector that is a plate-shaped member electrically connected to the electrode unit and has a thin portion formed relatively thinner than its surrounding, and further comprises a current breaking valve that is a plate-shaped member having a flange and a concavity. The flange in such a current breaking valve is a ring-shaped portion electrically connected to the electrode terminal. The concavity descends from the flange toward the thin portion and makes contact with the current collector placed opposite the concavity.

Herein, the concavity of the current cutoff mechanism is configured to comprise a sloped side wall which tapers with decreasing diameter from the inner circumference of the ring-shaped flange to the thin portion, and further comprise a dome (the bottom of the concavity in the drawing) descending in a spherical cap shape from the rim of the sloped side wall toward the thin portion. The rotation axis L of the concavity and the sloped side wall form an angle θ (or "slope angle θ" where appropriate hereinafter) such that $60° \leq \theta \leq 75°$ while the spherical cap-shaped dome has a sphere radius R of 30 mm or larger, but smaller than 100 mm. In a planer view along the rotation axis L, the outer circumference of the dome is located outside the outer circumference of the thin portion. In typical, in a cross section including the dome top (peak), the thin portion's diameter D1 and the dome's diameter D2 satisfy a relationship $D1<D2$.

In the sealed secondary battery disclosed herein, a concavity comprising a tapered, sloped side wall and a spherical cap-shaped dome are formed in a current breaking valve. A concavity having such a constitution has a larger pressure-receiving area than a concavity consisting of a conical frustum shape, whereby the actuation pressure of the current cutoff mechanism can be set low. In particular, in a large battery, even if the use of a gas-generating agent such as an overcharge additive, etc. is reduced or omitted; the current cutoff mechanism can be suitably actuated. Thus, even more preferable effects can be obtained in view of increasing battery performance or reducing manufacturing costs.

In the sealed secondary battery disclosed herein, a dome (the bottom of the concavity in the drawing) having a spherical cap shape is formed from a rim of the sloped side wall toward the thin portion. In other words, since the sloped side wall can contribute to a part of the height H2, even if the dome has a relatively large sphere radius R, a sufficient height H2 can be reserved. Thus, in the sealed secondary battery disclosed herein, although the dome is formed with a large sphere radius R and yield a large pressure-receiving area, the occurrence of conduction between the current breaking valve and current collector after inversion of the concavity can be suitably prevented.

When some battery's internal pressure is applied to the concavity in this embodiment, two locations may serve as origins of displacement (fulcrum or locations where displacement begins), namely the boundaries between the flange and the sloped side wall and between the sloped side wall and the dome. Since a current breaking valve in this embodiment has two locations where displacement begins, it may be allowed to invert to the electrode terminal side with less pressure as compared to a concavity consisting of a conical frustum shape or a concavity consisting of a spherical cap shape.

In a sealed secondary battery having such a constitution, the dome's diameter D2 and the thin portion's diameter D1 satisfy the relationship $D1<D2$. In a sealed secondary battery in the embodiment above, since the dome is formed in a spherical cap shape, even if its diameter D2 is larger than the thin portion's diameter D1, the dome (specifically, the center thereof) can be suitably pushed onto the thin portion. In addition, with the dome's sphere radius R being 30 mm or larger, but smaller than 100 mm, it can avoid damage in the thin portion caused by pushing with a dome having an excessively small sphere radius R. In the sealed secondary battery disclosed herein, even when the dome's diameter D2 and the thin portion's diameter D1 satisfy the relationship D1<D2 so as to increase the pressure-receiving area, the dome (concavity) and thin portion can be preferably attached (typically welded).

As described above, if the slope angle θ of the sloped side wall is decreased, the sloped side wall will become closer to perpendicular to the flange and the rigidity of the sloped side wall will increase. In this case, the sloped side wall becomes less susceptible to inversion and may not be inverted even when the dome is already inverted, whereby conduction between the current breaking valve and current collector may not be cut off properly. With a greater slope angle θ, the sloped side wall may become closer to parallel to the flange and the entire concavity may become more rigid, raising the actuation pressure of the current cutoff mechanism. In the sealed secondary battery disclosed herein, the sloped angle θ is set to 60°≤θ≤75°. Thus, the current breaking valve can be formed to require a low pressure for inversion and yield almost simultaneous inversion of the dome and the sloped side wall.

As described above, according to the sealed secondary battery disclosed herein, the actuation pressure of the current cutoff mechanism can be preferably lowered by combining a larger pressure-receiving area and reduced rigidity. In addition, while a sufficient height H2 is ensured from the inner circumference of the flange to the current collector, the concavity and the thin portion are allowed to be in proper contact. In other words, according to the sealed secondary battery disclosed herein, the current breaking valve can have a larger pressure-receiving area while various undesirable effects that may arise counteractively can be diminished. Accordingly, it is possible to obtain a current cutoff mechanism capable of suitably cutting a conductive path at a low actuation pressure.

In a preferable embodiment of the sealed secondary battery disclosed herein, in a cross section including the top (peak) of the spherical cap-shaped dome, the outermost rim of the tapered, sloped side wall is located on the inside in the radial direction relative to an arc R drawn along the curve of the spherical cap-shaped dome.

In a concavity comprising a sloped side wall and a dome, too high a ratio of sloped side wall's height H3 to total concavity height H2 (height from the flange to the current collector) will cause the entire concavity's shape to approach a conical frustum shape and the rigidity may become excessively high. With the dome's height H1 being excessively large, the shape of the entire concavity will become closer to a spherical cap and the rigidity may also become excessively high. In a sealed secondary battery that satisfies the constitution described above, the sloped side wall and the dome that constitute the concavity are well balanced in height; and therefore, the entire concavity can be prevented from being excessively rigid due to either the sloped side wall or the dome having an excessively large height.

In a preferable embodiment of the sealed secondary battery disclosed herein, the height H2 from the inner circumference of the flange to the current collector (or "the flange's height H2" hereinafter) is 0.8±0.05 mm.

In a sealed secondary battery in this embodiment, a distance enough to prevent conduction between the flange and current collector is reserved. Thus, conduction between the current breaking valve and current collector can be preferably prevented after the current breaking valve's concavity is inverted to the electrode terminal side.

In a preferable embodiment of the sealed secondary battery disclosed herein, the height H1 (the spherical cap-shaped dome's height H1) from the outer circumference of the dome adjacent to the sloped side wall up to the current collector is 0.3 mm to 0.5 mm.

In the sealed secondary battery disclosed herein, the contact area between the current breaking valve's concavity and the current collector's thin portion is defined by the height H1 and sphere radius R of the dome. In a sealed secondary battery having this constitution, the dome's sphere radius R is 30 mm or larger, but smaller than 100 mm while the dome's height H1 is 0.3 mm to 0.5 mm. In such a case, the dome and the thin portion can make contact over a suitable contact area. More specifically, an approximately circular contact area formed between the dome and the thin portion can assuredly have a diameter of 1.9 mm or larger.

In a preferable embodiment of the sealed secondary battery disclosed herein, the thin portion's diameter D1 and the dome's diameter D2 satisfy a relationship 2·D1<D2. In other words, it satisfies 2<D2/D1 (preferably 2.6<D2/D1<3.1). In a sealed secondary battery having such a constitution, the dome's diameter D2 is larger than twice the thin portion's diameter D1. Thus, it is designed such that when the force pushing the current collector increases during attachment of the thin portion and concavity, the dome would make contact with the boundary between the thin portion and thick portion so that the pushed distance would not be greater than a certain length. This suitably prevents damage to the thin portion during attachment of the concavity and the thin portion.

In another preferable embodiment of the sealed secondary battery disclosed herein, the spherical cap-shaped dome has a sphere radius R of 45 mm or larger, but smaller than 100 mm. In such a case, the approximately circular contact area formed between the dome and thin portion is allowed to have a yet larger diameter (e.g. 2 mm or larger).

For the sealed secondary battery described above, the actuation pressure to cut off a conductive path in response to a pressure rise inside the case can be set low. Thus, it can be preferably used in a large battery (e.g. a battery installed in a vehicle) that comprises a relatively large battery case and requires a large amount of gas to increase the internal pressure of the case. This description provides a vehicle battery comprising any of a sealed secondary battery disclosed herein. Such a vehicle battery (e.g. a battery used as a driving power supply for a vehicle including an electric automobile, hybrid automobile and the like, i.e. a vehicle drive battery) may be in a form of multi-cell battery comprising a plurality of single cells electrically connected to each other, with the single cell being a sealed secondary battery disclosed herein. The present description also provides a vehicle, such as a plug-in hybrid automobile (PHV), hybrid automobile (HV), electric automobile (EV) and the like, comprising, as a driving power supply, a sealed secondary battery or a multi-cell battery disclosed herein.

EMBODIMENTS OF INVENTION

Figure 1:
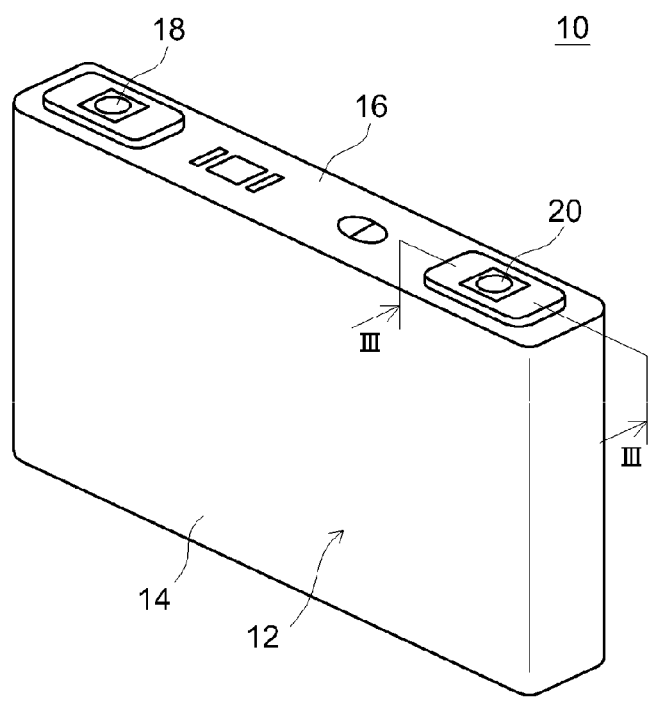
FIG. 1 shows a perspective view schematically illustrating the outer shape of a sealed secondary battery according to an embodiment.

Preferred embodiments of the present invention are described below. Matters necessary to practice this invention other than those specifically referred to in this description may be understood as design matters to a person of ordinary skills in the art based on the conventional art in the pertinent field. The present invention can be practiced based on the disclosure of this description and common technical knowledge in the subject field.

The concept of "secondary battery" in the present description includes storage batteries (i.e. chemical cells) such as lithium secondary batteries, lithium metal secondary batteries, nickel-hydrogen batteries, nickel-cadmium batteries and the like as well as capacitors (i.e. physical cells) such as electric double-layer capacitors and the like. The term "lithium secondary battery" refers to a secondary battery that uses lithium ions as electrolyte ions (charge carrier) and effects charging and discharging by charge transfer associated with lithium ions moving between the positive and negative electrodes. Secondary batteries generally called lithium-ion secondary batteries (or lithium-ion batteries) are typical examples included in the lithium secondary battery in the present description.

<Constitution of Sealed Secondary Battery>

Here is described the constitution of a sealed secondary battery representing an embodiment of the present invention while referring to drawings. As far as a current cutoff mechanism configured as disclosed herein is included, the type of secondary battery is not limited to a lithium-ion secondary battery (typically a lithium-ion secondary battery comprising a non-aqueous electrolyte) and may be a nickel-hydrogen battery or any other secondary battery. The dimensional relationships (of length, width, thickness, etc.) in each drawing do not represent actual dimensional relationships. Members or sites producing the same effects may be assigned with a common reference numeral, and duplicated descriptions are sometimes may be omitted or simplified.

Figure 2:
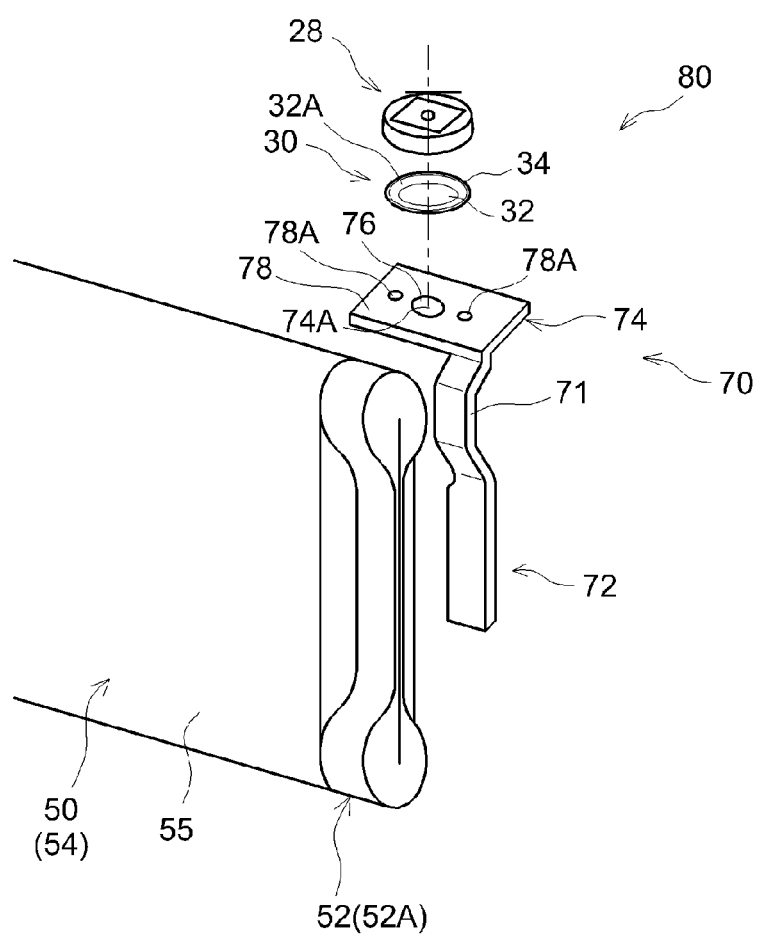
FIG. 2 shows an exploded perspective view illustrating the configuration of a current cutoff mechanism provided to the sealed secondary battery according to an embodiment.
Figure 3:
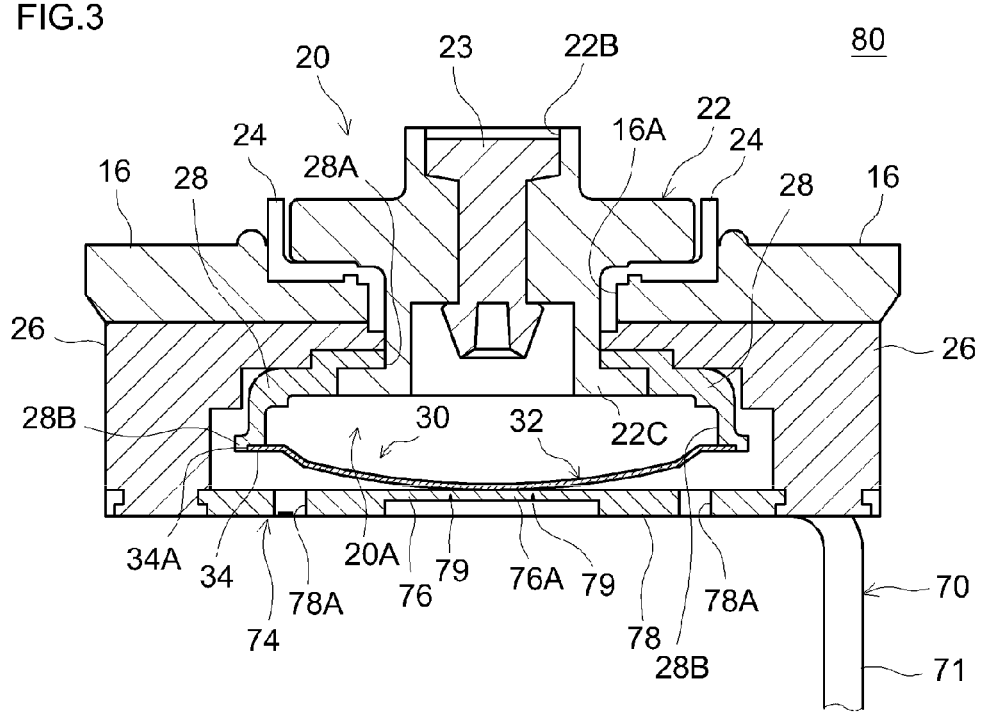
FIG. 3 shows a cross-sectional view schematically illustrating the configuration and state (before interruption of the current) of the current cutoff mechanism provided to the sealed secondary battery according to an embodiment.

FIG. 1 shows a schematic perspective view illustrating the external shape of a sealed lithium-ion secondary battery (or simply "sealed secondary battery" hereinafter) 10 disclosed herein. FIG. 2 shows an exploded perspective view illustrating the constitution of a current cutoff mechanism 80 in the sealed secondary battery 10. FIG. 3 shows an enlarged schematic cross-sectional view illustrating the current cutoff mechanism 80 in the cross section in FIG. 1, showing the state of current cutoff mechanism 80 before actuation. The cross section in FIG. 1 includes the top (peak) 32B1 of the dome 32B described later.

1. Electrode Unit

The sealed secondary battery disclosed herein comprises an electrode unit having a positive electrode and a negative electrode. As shown in FIG. 2, sealed lithium-ion secondary battery 10 according to the present embodiment comprises a flat wound electrode unit 50. Similarly to wound electrode bodies in general lithium-ion secondary batteries, the wound electrode unit 50 comprises a long sheet of positive electrode (positive electrode sheet) 52 and a long sheet of negative electrode (not drawn). Wound electrode unit 50 further comprises a long sheet of separator 54. Wound electrode unit 50 having the constitution shown in FIG. 2 is formed by layering the positive electrode sheet 52, negative electrode sheet and separator 54 with some widthwise offsets and winding the resultant in the length direction. At this point, on one edge along the axial direction of wound electrode unit 50, there is formed a margin 52A where the positive electrode sheet 52 is wound solely. On the other edge, there is formed a margin (not drawn) where the negative electrode sheet is wound solely. In the central region in the axial direction of wound electrode unit 50, there is formed a wound core 55 in which the positive electrode sheet 52, negative electrode sheet and separator 54 are tightly wound.

The materials and members constituting wound electrode unit 50 themselves can be the same as the wound electrode unit included in a conventional lithium-ion secondary battery without particular limitations. For instance, positive electrode 52 may have a constitution comprising a long positive current collector sheet (e.g. aluminum foil) and a positive electrode active material layer formed on the positive current collector sheet. As the positive electrode active material used to form the positive electrode active material layer, one, two or more species of substance used in conventional lithium-ion secondary batteries can be used without particular limitations. Preferable examples include oxides (lithium transition metal oxides) comprising lithium and a transition metal as constituent metals, such as lithium nickel oxide (e.g. $LiNiO_2$), lithium cobalt oxide (e.g. $LiCoO_2$), lithium manganese oxide (e.g. $LiMn_2O_4$), etc.; phosphates comprising lithium and a transition metal as Constituent metals, such as lithium manganese phosphate ($LiMnPO_4$), lithium iron Phosphate ($LiFePO_4$), etc.; And the like.

On the other hand, the negative electrode may have a constitution comprising a long negative current collector sheet (e.g. copper foil) and a negative electrode active material layer formed on the negative current collector sheet. As the negative electrode active material used to form the negative electrode active material layer, one, two or more species of substance used in conventional lithium-ion secondary batteries can be used without particular limitations. Preferable examples include carbon-based materials such as graphite carbon, amorphous carbon, etc., lithium transition metal oxides and lithium transition metal nitrides, and so on. Preferable examples of the separator sheet include a material constituted with a porous polyolefin-based resin.

2. Battery Case

The sealed secondary battery disclosed herein comprises a battery case housing the electrode unit. As shown in FIG. 1, the sealed secondary battery 10 according to the present embodiment uses, as a battery case 12, a flat, square box-shaped container corresponding to the shape of wound electrode unit 50. The battery case 12 is constituted with a cuboid main casing 14 having an opening at one end (corresponding to the top end of battery 10 in a typical use) and a lid 16 to be attached to the opening to close the opening. In the sealed lithium-ion secondary battery 10 according to the present embodiment, wound electrode unit 50 is placed along with an electrolyte solution (liquid electrolyte) in main casing 14, and lid 16 is welded to the opening circumference of main casing 14 to seal off the inside of battery case 12. As shown in FIG. 3, a terminal socket 16A is formed in lid 16. An electrode terminal (positive terminal 20, negative terminal 18) is inserted into the terminal socket 16A, with an end of the electrode terminal being exposed to the outside of the case 12.

As the material of battery case 12, those used in conventional sealed secondary batteries can be used without particular limitations. For instance, lightweight, highly heat-conductive metallic materials (aluminum, stainless steel, nickel-plated steel, etc.) can be preferably used.

While the present invention is not particularly limited, a hexahedral battery case in this type of square battery preferably has outer dimensions such as a long side of about 80 mm to 200 mm (e.g. 100 mm to 150 mm) for main casing 14 as well as lid 16, a short side (i.e. the thickness of case 12) of about 8 mm to 25 mm (e.g. 10 mm to 20 mm) for main casing 14 as well as lid 16, and a height of case 12 of about 70 mm to 150 mm. The thickness of wall surfaces of case 12 (main casing 14 and lid 16) is not particularly limited. When constituting a sealed secondary battery for a vehicle-driving power supply, it is suitably about 0.3 mm to 2 mm, or preferably about 0.5 mm to 1 mm.

As the electrode solution placed in battery case 12, the same non-aqueous electrode solutions as those conventionally used in lithium-ion secondary batteries can be used without particular limitations. Such a non-aqueous electrolyte solution typically has a composition comprising a suitable non-aqueous solvent and a supporting salt dissolved in the non-aqueous solvent. For example, as the non-aqueous solvent, can be used one, two or more species selected from a group consisting of ethylene carbonate (EC), propylene carbonate, dimethyl carbonate, diethyl carbonate (DEC), ethyl methyl carbonate, 1,2-dimethoxyethane, 1,2-diethoxyethane, tetrahydrofuran, 1,3-dioxolane and the like. As the supporting salt, for example, can be used lithium salts such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$ and the like. One example is a non-aqueous electrolyte solution containing about 1 mol/L of $LiPF_6$ in a mixed solvent of EC and DEC (e.g. a mixed solvent at an EC:DEC volume ratio of 1:1). In place of the electrolyte solution, an electrolyte in a solid form or gel form can be used.

An overcharge additive may be added also to the non-aqueous electrolyte solution. The overcharge additive herein refers to a compound soluble or dispersible in a non-aqueous electrolyte solution and capable of generating gas before decomposition of the non-aqueous solvent in the non-aqueous electrolyte solution when the battery reaches an overcharged state. Preferable examples of such a compound include branched-chain alkylbenzenes, cycloalkylbenzenes, biphenyls, terphenyls, diphenyl ethers and dibenzofurans. In particular, cycloalkylbenzenes such as cyclohexylbenzene (CHB), etc., and biphenyls such as biphenyl (BP), etc., are preferable while combined use of CHB and BP is particularly preferable.

As described later in detail, in the sealed secondary battery disclosed herein, current cutoff mechanism 80 can be properly actuated even with a small amount of gas generated. Accordingly, an overcharge additive can be used in a smaller amount (or not at all). This can reduce raw material costs while increasing battery performance.

3. Electrode Terminal

The sealed secondary battery disclosed herein comprises an electrode terminal which is a tubular member. Herein, the term "electrode terminal" is a general term for positive electrodes and negative electrodes, and electrode terminals of equivalent constitutions may be used for both. For convenience, the constitution on the positive electrode side of sealed secondary battery 10 is described below. However, an equivalent constitution can be used on the negative electrode side. In other words, the present invention is not limited by on which side of the sealed secondary battery, on the positive electrode side or on the negative electrode side, the electrode terminal, current cutoff mechanism and current collector having constitutions as described below are used.

As shown in FIG. 3, in the present embodiment, an electrode terminal (positive terminal 20) comprises a connecting terminal 22, a gasket 24, an insulator 26 and a breaking valve holder 28. Connecting terminal 22 is a tubular member having a through-hole 22B and inserted in the terminal socket 16A of lid 16. Gasket 24 is a cap-like member having a hole into which connecting terminal 22 is inserted, and is placed between lid 16 and connecting terminal 22. Insulator 26 is a cylindrical member formed from an insulating resin. It is in contact with battery case 12 (lid 16) and also houses, in its opening, connecting terminal 22, breaking valve holder 28, current breaking valve 30 and current collector 70 so as to prevent conduction between wound electrode unit 50 and battery case 12. Breaking valve holder 28 is a conductive member to hold current breaking valve 30 described later, and forms a conductive path between current breaking valve 30 and connecting terminal 22. A rubber terminal stopper 23 is enclosed in through-hole 22B of connecting terminal 22.

Electrode terminal 20 according to the present embodiment is formed in one united body fixed to lid 16 by inserting connecting terminal 22 into the respective holes formed in gasket 24, insulator 26 and breaking valve holder 28 as well as into terminal socket 16A, followed by caulking connecting terminal 22 at its end 22C on the inside of battery case 12.

4. Current Cutoff Mechanism

In the sealed secondary battery disclosed herein, a current cutoff mechanism is arranged in a conductive path between the electrode unit and the electrode terminal. The current cutoff mechanism comprises a current breaking valve and a current collector. When no gas has been produced in the case, the current breaking valve and current collector are in contact (e.g. joined with a weld) and the conductive path is formed to include the point of contact (see FIG. 3). The sealed secondary battery is charged and discharged via the conductive path.

On the other hand, the current cutoff mechanism is constituted so that the conductive path is cut off when the internal pressure of the case increases. In sealed secondary battery 10 according to the present embodiment, as shown in FIG. 2 and FIG. 3, through a current collector 70, current cutoff mechanism 80 and breaking valve holder 28, a conductive path is formed from wound electrode unit 50 to connecting terminal 22. An increase in the case's internal pressure will cause inversion of current breaking valve 30 of current cutoff mechanism 80 toward the electrode terminal 20 and the contact between current breaking valve 30 and current collector 70 is lost, whereby the conductive path is cut off (see FIG. 5).

Figure 6:
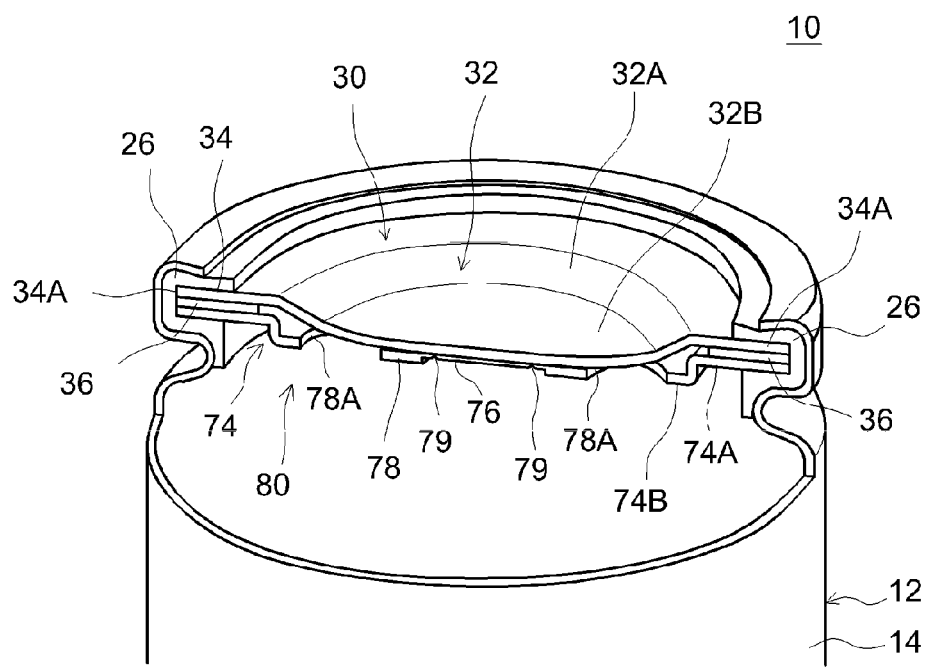
FIG. 6 shows a partially cutaway perspective view illustrating the configuration and state (before interruption of the current) of a current cutoff mechanism provided to a sealed secondary battery according to another embodiment.
Figure 7:
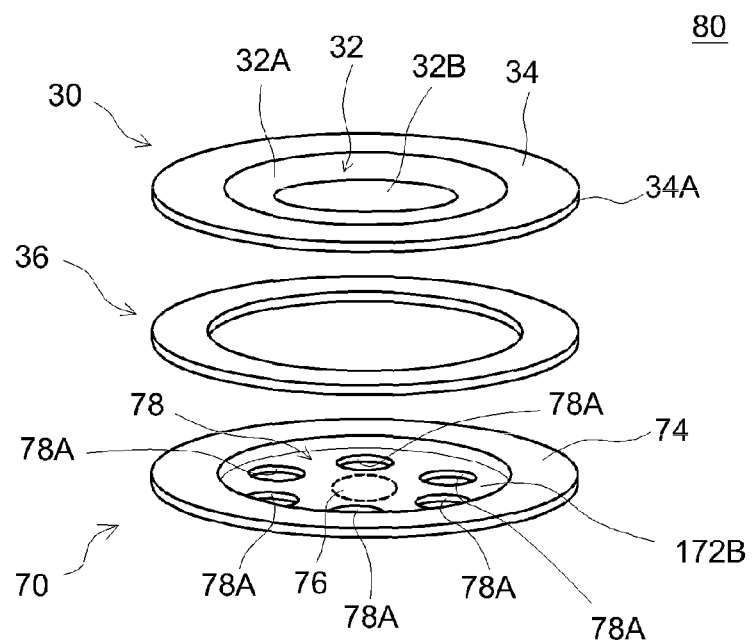
FIG. 7 shows an exploded perspective view illustrating the configuration of a current cutoff mechanism provided to a sealed secondary battery according to another embodiment.

As shown in FIG. 6 and FIG. 7, current cutoff mechanism 80 may further comprise a spacer 36. Spacer 36 is, for instance, a ring-shaped member formed from an insulating resin. As shown in FIG. 6, it is placed between current breaking valve 30 (flange 34) and current collector 70. This prevents conduction between flange 34 and current collector 70. In current cutoff mechanism 80 having such a constitution, concavity 32 of current breaking valve 30 passes through the opening of the ring-shaped spacer 36 to make contact with a thin portion 76 of current collector 70.

4-1. Current Collector

The current collector is a plate-shaped member electrically connected to the electrode unit. As shown in FIG. 2, positive current collector 70 according to the present embodiment comprises a positive current collector tab 72 electrically connected to positive electrode 52 of electrode unit 50, a main current collector (i.e. current collector plate 74), a connecting arm 71 connecting the current collector plate 74 and positive current collector tab 72. Current collector plate 74 is a rectangular plate-shaped portion (typically a right-angled tetragonal plate-shaped portion) formed extending upward (i.e. in the direction toward lid 16) from current collector tab 72, and is placed adjacent to the inside of lid 16 of battery case 12 almost in parallel to the lid 16. A gas vent 78A is formed in current collector plate 74. By this, the internal pressure of the case increased by produced gas is applied to current breaking valve 30 and current breaking valve 30 is inverted in response to the internal pressure rise.

Current collector plate 74 is preferably formed with a highly conductive metal. For example, aluminum and an alloy primarily comprising aluminum are preferably used. Current collector plate 74 can usually have a thickness of about 0.5 mm to 2 mm, for instance, about 1 mm.

The current collector comprises a thin portion formed relatively thinner than the surrounding. In the present embodiment, as shown in FIG. 2 and FIG. 3, a thin portion 76 and a thick portion 78 are formed in the rectangular current collector plate 74. The thin portion 76 is formed by means of press working, etc., by making an cylindrical recess in current collector 74 (thick portion 78) on the face inside battery case 12, with the recess descending toward the electrode terminal 20 side. The thin portion 76 preferably has a thickness of 0.1 mm to 0.5 mm (preferably 0.1 mm to 0.2 mm). With it having a thickness of 0.5 mm or smaller, the thin portion 76 is suitably warped when pushed with the dome 32B so as to likely obtain a proper contact area between the two, making it easy to weld the dome 32B and thin portion 76. With the thin portion 76 having a thickness of 0.1 mm or larger, the thin portion 76 can be provided with suitable strength. Inadvertent damage to the thin portion 76 is prevented and the yield rate of production can be increased. In this embodiment, the thin portion 76 has a cylindrical shape, but the shape of thin portion 76 is not limited to a cylindrical shape. For instance, the thin portion 76 may have a polygonal columnar shape including a square columnar shape, etc.

Figure 4:
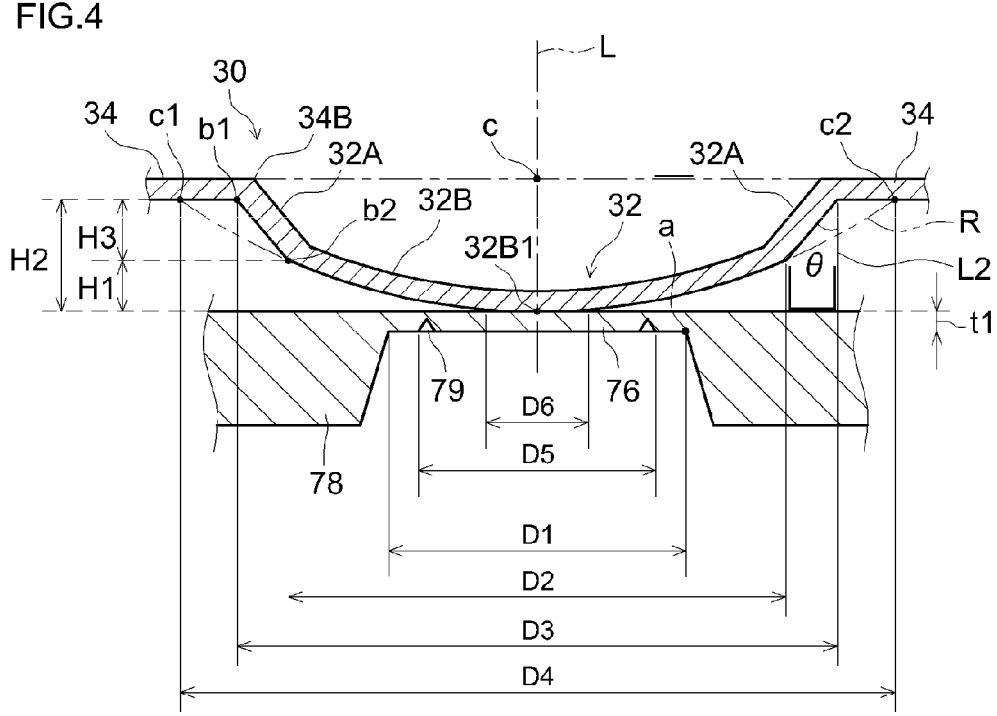
FIG. 4 shows an enlarged cross-sectional view illustrating the shape of a current breaking valve included in the current cutoff mechanism provided to the sealed secondary battery according to an embodiment.

As shown in FIG. 3 and FIG. 4, a notch 79 may be formed in the thin portion 76 in the surface inside the case 12. It is preferable that the notch 79 is formed circularly around the circumference of the thin portion 76. With such notch 79 formed therein, the location at which the thin portion 76 breaks off upon actuation of current cutoff mechanism 80 can be designated, whereby the conductive path from wound electrode unit 50 through electrode terminal 20 can be suitably cut off. Usually, the thickness of the thin portion 76 at notch 79 can be suitably 0.03 mm to 0.08 mm, for instance, about 0.045 mm.

4-2. Current Breaking Valve

The current breaking valve is a plate-shaped member having a flange electrically connected to the electrode terminal and a concavity descending from the inner circumference of the flange toward the thin portion. The current breaking valve is placed opposite the current collector and is in contact with the thin portion at the peak of the concavity descending toward the current collector's thin portion.

In the present embodiment, as shown in FIG. 4, the flange 34 of current breaking valve 30 and current collector (current collector plate) 74 are placed substantially in parallel. Usually, current breaking valve 30 has a thickness (plate thickness) of suitably about 0.1 mm to 0.5 mm or preferably 0.2 mm to 0.3 mm. Current breaking valve 30 is preferably constituted with a highly conductive metal. For instance, aluminum and an alloy primarily comprising aluminum are preferably used.

4-2-1. Flange

As described above, the flange is electrically connected to the electrode terminal. In the present embodiment, as well depicted in FIG. 3, flange 34 is a ring-shaped member having an outer circumference 34A welded to a rim 28B of breaking valve holder 28 of electrode terminal 20. By this means, current breaking valve 30 and electrical terminal 20 are electrically connected while the internal space 20A of electrode terminal 20 is sealed with current breaking valve 30. In the present embodiment, flange 34 and current collector 70 are placed substantially in parallel. The distance (flange 34 height) H2 from flange 34 through current collector (current collector plate) 74 is designed so that the conduction between current breaking valve 30 and current collector (current collector plate) 74 can be surely cut off (e.g. recurrence of conduction can be prevented) after concavity 32 is inverted to the electrode terminal 20 side.

4-2-2. Concavity

In the sealed secondary battery disclosed herein, the concavity comprises a sloped side wall and a dome. In sealed secondary battery 10 of the present embodiment, in the cross-sectional view shown in FIG. 4, there is formed an arced dome 32B continuously from the lower end (rim) of the tapered, sloped side wall 32A. Concavity 32 according to this embodiment has a rotational form. In other words, in FIG. 4, concavity 32 comprising sloped side wall 32A and dome 32B as shown in FIG. 7 is formed by rotating concavity 32 having the aforementioned cross-sectional constitution around the rotation axis L which orthogonally intersects the midpoint C of a line bridging across the inner circumference of flange 34 (corresponding to the midpoint of the diameter D3 of ring-shaped flange 34). As shown in FIG. 4, when some pressure is applied from the current collector 70 side to current breaking valve 30, two locations, namely a boundary b1 between flange 34 and sloped side wall 32A and a boundary b2 between sloped side wall 32A and dome 32B, may serve as locations of start of displacement. Accordingly, as compared to a current breaking valve having a concavity consisting of a conical frustum shape or a concavity consisting of a spherical cap shape, it may be less rigid and more susceptible to inversion by the internal pressure of the case acting thereon.

4-2-2-1. Sloped Side Wall

The sloped side wall is a tapered portion descending from the inner circumference of the ring-shaped flange toward the current collector's thin portion. In the present embodiment, as shown in FIG. 4, the tapered, sloped side wall 32A is formed in such a manner that flat plate-shaped current breaking valve 30 descends from the inner circumference 34B of flange 34, tapered at a prescribed angle.

In the sealed secondary battery disclosed herein, the rotation axis L and sloped side wall 32A form a slope angle θ wherein 60°≤θ≤75° (preferably 60°<θ<75°, e.g. 70°±2°). In FIG. 4, for illustration purposes, the slope angle θ is shown as an angle formed by a line L2 in parallel with the rotation axis L and sloped side wall 32A. As in this embodiment, when flange 34 and current collector 70 are placed substantially in parallel, the slope angle θ can be considered also as the angle formed between the line L2 orthogonal to both flange 34 and current collector plate 74 and sloped side wall 32A.

Figure 23:
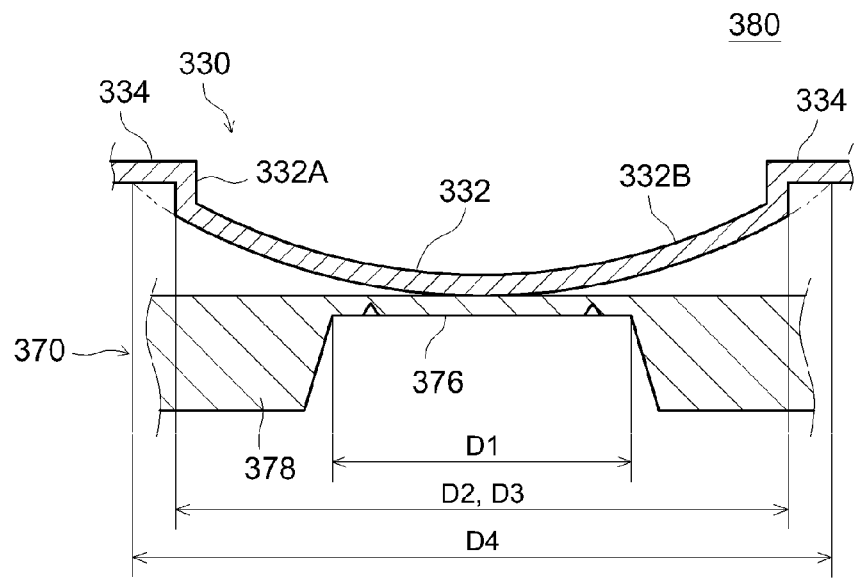
FIG. 23 shows a cross-sectional view of a current cutoff mechanism comprising a current breaking valve with a slope angle θ of 0°.

When the slope angle θ approaches 0°, e.g., as in a current cutoff mechanism 380 shown in FIG. 23, a sloped side wall 332A becomes substantially orthogonal to a current collector (current collector plate) 370. In this embodiment, sloped side wall 332A becomes more rigid relative to the internal pressure of the case, and thus, less susceptible to inversion. Accordingly, a dome 332B may be inverted solely while sloped side wall 332A does not undergo inversion at all or until the case's internal pressure significantly increases (concavity 32 undergoes two-stage inversion). Thus, even if dome 332B is inverted to lose the contact with a thin portion 376, the conduction may continue between a current breaking valve 330 and current collector 370.

Figure 24:
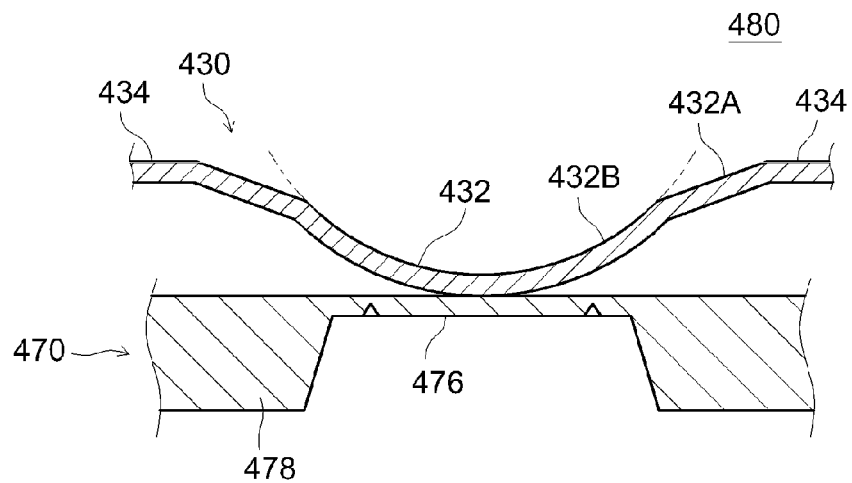
FIG. 24 shows a cross-sectional view of a current cutoff mechanism comprising a current breaking valve with a slope angle θ of 79°.

On the other hand, as in a current cutoff mechanism 480 in FIG. 24, as the slope angle θ approaches 90°, the height from the innermost circumference of a sloped side wall 432A to a thin portion 476 increases. That is, the height H1 from the outermost circumference of a dome 432B to the thin portion 476 increases. Thus, the sphere radius R of a dome 432B becomes smaller. This increases the rigidity of dome 432B and makes concavity 32 less susceptible to inversion, whereby the actuation pressure of current cutoff mechanism 480 tends to be high.

In the sealed secondary battery disclosed herein, the slope angle θ is set within a range of 60°≤θ≤75°. Thus, the pressure required to invert the current breaking valve can be set low and the current breaking valve can be formed so that the dome and sloped side wall undergo inversion approximately at the same time.

4-2-2-2. Dome

The dome (the bottom of the concavity) is a portion descending in a spherical cap shape from the circumference of the rim (i.e. the current collector side edge) of the tapered, sloped side wall toward the thin portion.

In the sealed secondary battery disclosed herein, the sphere radius R of the spherical cap-shaped dome is set to 30 mm or larger, but smaller than 100 mm (preferably 45 mm or larger, but smaller than 100 mm, more preferably 50 mm or larger, but 70 mm or smaller). This increases the pressure-receiving area of the entire concavity 32 while allowing the dome 32B and thin portion 76 to suitably make contact.

A sphere radius R of 45 mm or larger allows formation of a dome 48 having a low height H1 while further enlarging the pressure-receiving area, whereby current breaking valve 30 can be constructed to undergo inversion to the electrode terminal 20 side at a lower pressure. With a sphere radius R of 50 mm or larger, the contact area between the dome 32B and thin portion 76 can be further increased (e.g. the diameter D6 of the area in contact can be 2 mm or larger).

With the sphere radius R being 70 mm or smaller, the height H3 of sloped side wall 32A contributes less to the height H2 of the entire concavity 32 (the height of the inner circumference of flange 34); and therefore, the slope angle θ can be readily set to a preferable degree disclosed herein.

As shown in FIG. 4, in the sealed secondary battery according to the present embodiment, the outermost rim b1 of sloped side wall 32A is placed on the inside in the radial direction relative to an arc R drawn along the curve of dome 32B. In other words, the distance (diameter D4) between points c1 and c2 where an imaginary arc R drawn along (formed by extrapolation of) the curve of dome 32B intersects flange 34 is larger than the diameter D3 of the inner circumference 34B of flange 34 (the diameter D3 of the outermost rim b1 of sloped side wall 32A) (D3<D4).

Figure 17:
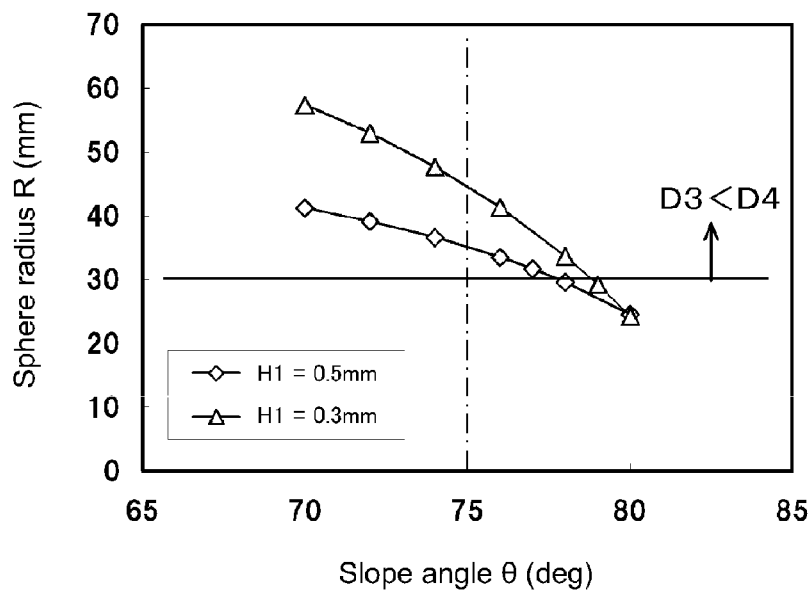
FIG. 17 shows a graph indicating the relationship between the dome's sphere radius R and the sloped side wall's slope angle θ.

The relationship between D3 and D4 will be reversed when the height H1 of dome 32B or the height H3 of sloped side wall 32A is excessively larger relative to the height H2 of flange 34 or when the sphere radius R of dome 32B or the slope angle θ of sloped side wall 32A is excessively large, and so on. For instance, when D1 is less than D2, the flange 34 has a height H2 of 0.8 mm, the dome 32B has a sphere radius R of 30 mm or larger (e.g. 30 mm to 100 mm) and the outer circumference of dome 32B has a height H1 of 0.5 mm or smaller (e.g. 0.3 mm to 0.5 mm); as shown in FIG. 17 obtained by CAD (computer aided design), if the slope angle θ is 78° or smaller, D3<D4 is satisfied. In other words, designing the shapes of the respective members to establish the relationship D1<D2 can prevent an excessively large ratio of height H1 of dome 32B to height H2 of the flange as well as an excessively small sphere radius R of concavity 32. It can also prevent an excessively large ratio of height H3 of sloped side wall 32A to height H2 of the flange as well as an excessively small slope angle θ.

Figure 18:
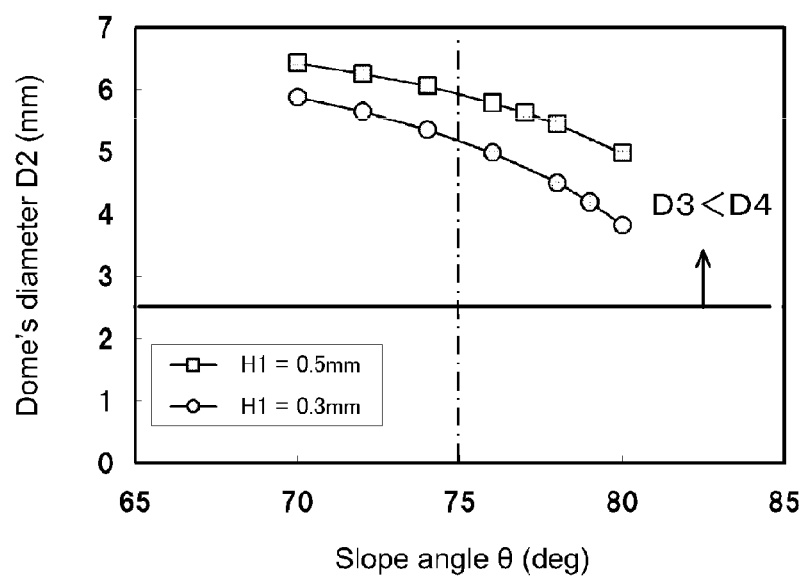
FIG. 18 shows a graph indicating the relationship between the dome's diameter D2 and the sloped side wall's slope angle θ.

In the relationship between the diameter D2 of dome 32B and slope angle θ, D3<D4 is satisfied if D1 is less than D2, flange 34 has a height H2 of 0.8 mm, the dome has a diameter D2 of 2.5 mm or larger, the outer circumference of dome 32B has a height H1 of 0.5 mm or smaller (e.g. 0.3 mm to 0.5 mm) and the slope angle θ is 80° or smaller (e.g. 75° or smaller) as shown in FIG. 18 obtained by CAD.

In the sealed secondary battery 10 disclosed herein, in concavity 32, there is formed a dome 32B descending in a spherical cap shape from the rim of sloped side wall 32A with a slope angle θ, 60°≤θ≤75°, toward current collector 70. According to a sloped side wall 32A having such a slope angle θ, even if the dome 32B is formed with a relatively large sphere radius R, a suitable height H2 can be easily reserved from the inner circumference of flange 34 to current collector 70.

When the slope angle θ of sloped side wall 32A and height H2 of flange 34 are prescribed, if the sphere radius R of the dome 32B increases, the ratio of height H1 of dome 32B to height H2 of flange 34 decreases and the ratio of height H3 of sloped side wall 32A increases. Too large a sphere radius R of dome 32B will decrease the slope angle θ, thereby making timely actuation of current cutoff mechanism 80 difficult.

On the other hand, with decreasing sphere radius R of dome 32B, the ratio of height H1 of dome 32B to height H2 of flange 34 increases while the ratio of height H3 of sloped side wall 32A decreases. When the dome 32B has an excessively small sphere radius R, the dome 32B becomes more rigid due to the excessively small sphere radius R and the actuation pressure of current cutoff mechanism 80 increases.

As described above, in the sealed secondary battery disclosed herein, by setting the sphere radius R of dome 32B to 30 mm or larger, but smaller than 100 mm, the dimensions of the respective other portions can be set in suitable ranges. By this means, a current cutoff mechanism that stably works at a low actuation pressure can be properly constructed.

The current breaking valve disclosed herein makes contact with the thin portion at the top of the spherical cap-shaped dome. At such a contact area, it is preferable that the concavity and the thin portion are attached, for instance, by means of welding (ultrasonic welding, laser welding, etc.), bonding with a conductive adhesive, and so on. In this embodiment, the top 32B1 of dome 32B is fixed by laser welding to the thin portion 76 of the current collector plate 74. In addition, it is more preferable that a circular notch 79 is formed to surround the perimeter of the weld. This can designate the location where the thin portion 76 breaks off upon actuation of current breaking valve 30.

In the sealed secondary battery 10 disclosed herein, in a cross section including the top 32B1 of dome 32B as in FIG. 4, the diameter D1 of thin portion 76 and diameter D2 of dome 32B satisfy the relationship D1<D2. In the current breaking valve 30 disclosed herein, the bottom of concavity 32 forms the spherical cap-shaped dome 32B. Thus, even when the diameter D2 of dome 32B is larger than the diameter D1 of thin portion 76 to increase the pressure-receiving area of concavity 32, the center of dome 32B can be suitably pushed onto the thin portion 76. In addition, the dome 32B having a sphere radius R of 30 mm or larger, but smaller than 100 mm can prevent damage to the thin portion 76 caused by dome 32B of an excessively small sphere radius R pushing thereon while preventing a weld failure caused by dome 32B of an excessively large sphere radius R pushing thereon.

The relationship between the thin portion's diameter D1 and the dome's diameter D2 more preferably satisfy 2<D2/D1 (more preferably 2.6<D2/D1<3.1). While detailed description will be given later, in a preferable embodiment, when constructing current cutoff mechanism 80, the dome 32B of current breaking valve 30 is pushed onto the thin portion 76 of current collector 70 and these members are welded in a state where the dome 32B and thin portion 76 are in tight contact. For this, the force pushing the dome 32B onto the thin portion 76 (pushing force) is set so as not to damage the thin portion 76 while reserving a suitable contact area. However, variation in sizes of components due to manufacturing errors or variation in the set pushing force may excessively increase the distance over which the dome 32B is pushed to the thin portion 76 (pushed distance or pushed depth) (see FIG. 9). In this case, the thin portion 76 may be damaged by excessive stress applied thereupon and may cause a decrease in the yield rate.

Figure 9:
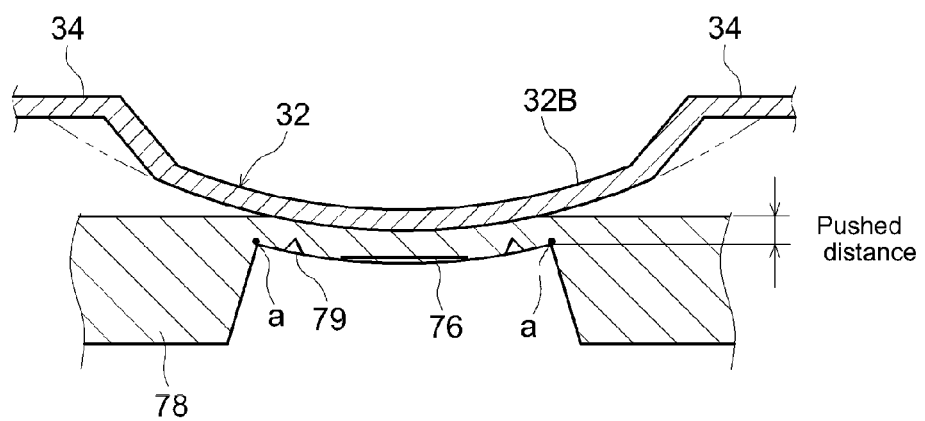
FIG. 9 shows an enlarged cross-sectional view illustrating the main part of the current cutoff mechanism in FIG. 3.

On the contrary, in sealed secondary battery 10 having the aforementioned constitution, since the diameter D2 of dome 32B is larger than the thin portion's diameter D1, even with variation in the component sizes or pushing force, for instance, the pushed distance is controlled not to extend too much because, as shown in FIG. 4 and FIG. 9, when the dome 32B makes contact with the boundary a between the thin portion 76 and thick portion 78, any extra pushing force can be received by the thick portion 78.

In addition, the sphere radius R set smaller than 100 mm prevents the contact area between the concavity 32 and thin portion 76 from becoming too flat a plane and prevents formation of a gap between the dome 32B and thin portion 76 when the thin portion 76 and concavity 32 are pushed together.

The sphere radius R of dome 32B set larger than 30 mm can prevent damage to the thin portion 76 caused by a sharp dome 32B. The diameter D6 of the contact area can be stabilized relative to the pushed distance. This will be described, using FIG. 10 and FIG. 11 obtained by CAE (computer sided engineering).

Figure 10:
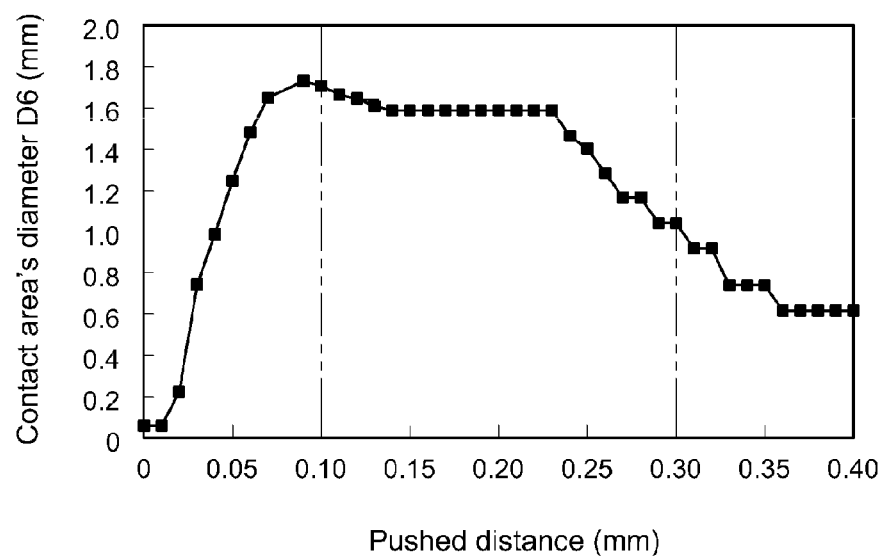
FIG. 10 shows a graph indicating the relationship between the pushed distance and the contact area's diameter D6 when welding a current breaking valve comprising a spherical cap-shaped concavity to a current collector.

In particular, when the sphere radius R of dome 32B is excessively small, with respect to the relationship between the distance (depth) pushed with the dome 32B to the thin portion 76 and the diameter D6 of the contact area, as shown in FIG. 10, the contact area's diameter D6 is just about 1.7 mm even at the largest pushed distance and its value is stable relative to the pushed distance only in a narrow range. From the standpoint of increasing the productivity or yield rate, it is desirable that even if the pushed distance is varied by 0.2 mm or so, the contact area's diameter D6 does not change largely. In FIG. 10, when the pushed distance is larger than about 0.25 mm, the contact area's diameter D6 decreases. This happens because when the dome 32B make contact with the boundary a between the thin portion 76 and thick portion 78, at or beyond this pushed distance, somewhere between the center of dome 32B and boundary a, a space tends to be formed between the dome 32B and thin portion 76.

Figure 11:
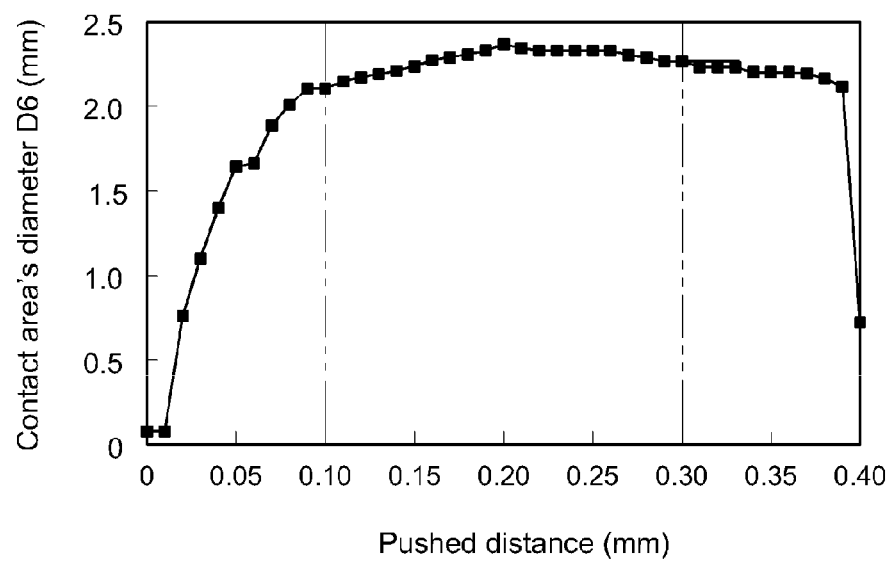
FIG. 11 shows a graph indicating the relationship between the pushed distance and the contact area's diameter D6 when welding a current breaking valve comprising a tapered, sloped side wall and a spherical cap-shaped dome to a current collector.

On the other hand, as shown in FIG. 11, when the sphere radius R of dome 32B is 30 mm or larger, the maximum value of contact area's diameter D6 can be further increased (e.g. to 2.0 mm or larger) and the diameter D6 can stably maintained at 2.0 mm or larger even if the pushed distance is varied by about 0.20 mm or more (e.g. in a pushed distance range of 0.10 mm to 0.30 mm). Such a relationship between the contact area's diameter D6 and the pushed distance can bring about consistent weld quality.

4-3. Dimensions of Current Cutoff Mechanism

Description of the current breaking valve and current collector constituting the current cutoff mechanism are provided above. Described next are the specific dimensions with respect to the respective members constituting current cutoff mechanism 80 in sealed secondary battery 10 according to the present embodiment. The present invention is not particularly limited by the dimensions described below.

4-3-1. Flange Height H2

As described above, in the sealed secondary battery 10 disclosed herein, flange 34 can have a height H2 (distance from the inner circumference of flange 34 to current collector 70) to prevent conduction between flange 34 and current collector 70 upon inversion of concavity 32 to the electrode terminal 20 side. More specifically, the flange 34 can have a height H2 of 0.5 mm to 1.5 mm (preferably 0.6 mm to 1.0 mm, more preferably 0.8±0.05 mm, e.g. about 0.8 mm).

Specific dimensions of each member in the current cutoff mechanism 80 according to the present embodiment can be determined, for instance, by designating the height H2 of flange 34. As an example of a set of dimensions of the current cutoff mechanism disclosed herein, preferable dimensions are cited below for each member in an embodiment wherein the flange height H2 is prescribed to about 0.8 mm (typically 0.8±0.05 mm) while the outer diameter of the flange is prescribed to about 16 mm (typically 16±0.1 mm). The scope of the present invention is, however, not limited by these dimensions.

4-3-2. Dome Height H1

As described above, an excessively large dome height H1 will decrease the sphere radius R of dome 32B, likely providing excessive rigidity to dome 32B. On the other hand, an excessively small height H1 will increase the sphere radius R of dome 32B and result in an excessively small slope angle θ, likely leading to inconsistent inversion action of current breaking valve 30. For these reasons, the dome 32B's height H1 is preferably selected so that the slope angle θ of slope side wall 32A can satisfy 60°≤θ≤75° while the sphere radius R of dome 32B can be set to 30 mm or larger, but smaller than 100 mm. More specifically, when the flange 34's height H2 is set at 0.8 mm, as long as the dome 32B's height H1 is in a range of 0.3 mm to 0.5 mm, the slope angle θ can meet 60°≤θ≤75° and the sphere radius R can be 30 mm or larger, but smaller than 100 mm.

Figure 16:
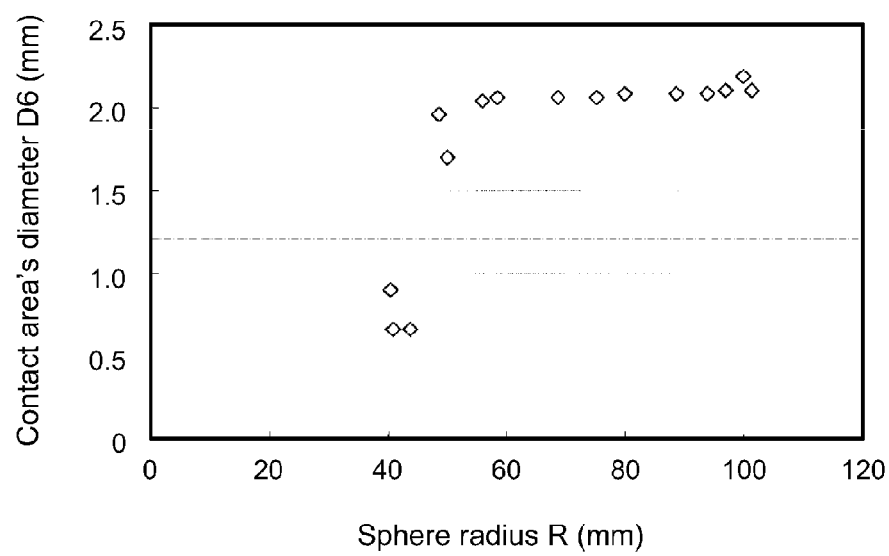
FIG. 16 shows a graph indicating the relationship between the dome's sphere radius R and the contact area during pushing operation.

When the dome 32B's height H1 is 0.3 mm to 0.5 mm, with the sphere radius R of dome 32B being 30 mm or larger, but smaller than 100 mm, the contact area between the dome 32B and thin portion 76 can be easily set to a suitable value (e.g. a contact area's diameter D6 of 1.9 mm or larger). For example, as shown in FIG. 16 obtained by CAE, when the height H1 is 0.3 mm, if the sphere radius R of dome 32B is larger than 50 mm, the diameter D6 of the contact area between the dome 32B and thin portion 76 suddenly increases. When a large diameter D6 is reserved for the contact area, variation in the weld quality (e.g. weld strength) between the dome 32B and thin portion 76 can be readily reduced. Thus, malfunction of current cutoff mechanism 80 caused by a weld failure can be suitably prevented.

4-3-3. Thin Portion's Diameter D1

The thin portion 76 preferably has a diameter in a range of, for instance, 4 mm to 6 mm (preferably 4.5 mm to 5.5 mm). In an embodiment where the thin portion 76 is provided with a circular notch 79, the notch 79 may have a diameter D5 of 3.0 mm to 5.0 mm (e.g. about 3.6 mm). It is preferable to provide notch 79 so as to surround the contact area between the dome 32B and thin portion 76. Thus, the notch diameter D5 can be set larger than the contact area's diameter D6. By this, the dome 32B and thin portion 76 can be attached on the inside relative to notch 79 to allow the thin portion 76 to break off at a suitable location upon inversion of current breaking valve 30.

4-3-4. Dome's Diameter D2

As described above, the dome 32B's diameter D2 is preferably set to establish D1<D2 (preferably 2<D2/D1, more preferably 2.6 D2/D1<3.1) in terms of the relationship with the thin portion 76's diameter D1. More specifically, for instance, when the thin portion 76's diameter D1 is set to 4 mm to 6 mm (preferably 4.5 mm to 5.5 mm), the dome 32B's diameter D2 is preferably 10 mm to 15 mm (preferably 11 mm to 13 mm).

Figure 14:
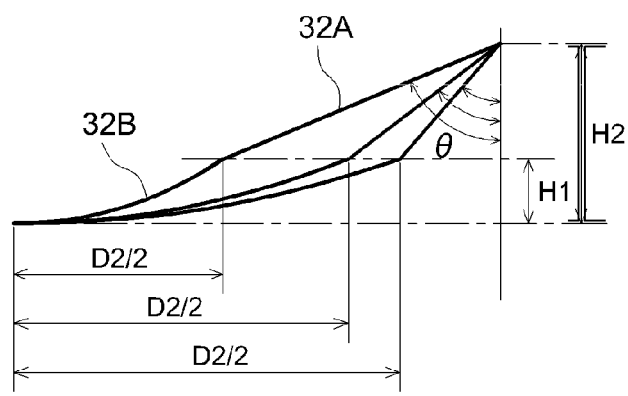
FIG. 14 shows a schematic diagram illustrating how the slope angle θ of a sloped side wall is defined by the dome height H1 and the dome's diameter D2 in a current cutoff mechanism having a prescribed height H2 from the flange's inner circumference to the current collector.
Figure 15:
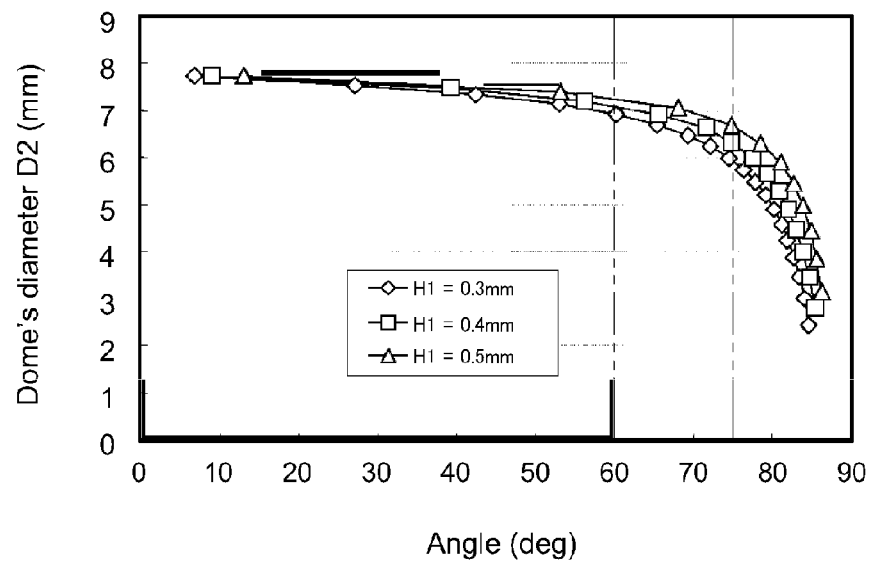
FIG. 15 shows a graph illustrating how the slope angle θ of a sloped side wall is defined by the dome's height H1 and the dome's diameter D2.

As shown in FIG. 14, when the flange height H2 is prescribed, a preferable slope angle θ of sloped side wall 32A is fixed by defining the diameter D2 of dome 32B (in FIG. 14, the radius D2/2 of dome 32B is shown for convenience of illustration) and height H1 of dome 32B. Once the slope angle θ and the dome 32B's height H1 are determined, a preferable value is fixed for the sphere radius R of dome 32B. For example, in a current cutoff mechanism wherein the flange height H2 is 0.8 mm, by means of CAD, the relationship among the diameter D2 and height H1 of the dome and the slope angle θ of the sloped side wall can be indicated by a graph as shown in FIG. 15. For a current breaking valve having 0.3 mm dome height H1, the dome's diameter D2 can be set in a range of 6 mm to 7 mm. When the dome height H1 is 0.4 mm, D2 can be set in a range of 6.4 mm to 7.2 mm. When the dome height H1 is 0.5 mm, D2 can be set in a range of 6.6 mm to 7.4 mm. For this, the slope angle θ can be in the range of 60°≤θ≤75°.

4-3-5. Diameter D3 of Inner Circumference of Flange 34

When the flange height H2 is set to a prescribed value, the diameter D3 of the inner circumference of flange 34 can be set so that the slope angle θ of slope side wall 32A is 60° to 75° while the sphere radius R of dome 32B is 30 mm or larger, but smaller than 100 mm. For instance, when the height H2 is 0.8 mm, the diameter D3 of the inner circumference of flange 34 can be 10 mm to 25 mm (preferably 15 mm to 20 mm) in order to satisfy that the slope angle θ is 60° or larger, but 75° or smaller while the sphere radius R is 30 mm or larger, but smaller than 100 mm.

4-3-6. Relationship Between Notch Shape and Concavity Shape

When a circular notch 79 is formed in the thin portion 76, by satisfying a formula (1) shown below, current cutoff mechanism 80 can be constructed so that current breaking valve 30 undergoes inversion at a suitable actuation pressure and the thin portion 76 breaks off at the location where notch 79 is formed.

$$D5 \cdot T1 \cdot P1 \leq D6 \cdot T2 \cdot P2 \quad (1)$$

D5: notch diameter (mm)
T1: thickness at notch (mm)
P1: tensile strength at notch (N)

D6: diameter of weld (mm)
T2: thickness of thin portion (mm)
P2: tensile strength of thin portion (N)

Among the respective variables in the formula (1), all variables except the weld diameter D6 originate from the constitution of the thin portion 76 obtained in advance. In other words, by adjusting the weld diameter D6 in accordance with the prepared constitution of the thin portion 76 of current collector 70, current cutoff mechanism 80 can be constructed to allow a suitably located break-off of the thin portion 76. More specifically, when using the thin portion 76 where D5=3.6 mm, T1=0.045 mm, P1=90 N, T2=0.2 mm and P2=30 N, the formula (1) is met if the weld diameter D6 is 2.43 mm or larger. As described above, the weld diameter D6 is fixed by the height H1 and sphere radius R of dome 32B. Thus, by adjusting these values to yield the diameter D6≥2.43, current cutoff mechanism 80 can be constructed to allow a proper break-off of the thin portion 76. To obtain proper interruption of the conductive path upon the break-off of notch 79, the dome 32B and thin portion 76 need to make contact on the inside relative to notch 79. Thus, if the diameter D5 of notch 79 is 3.6 mm, the weld diameter D6 is required to be smaller than 3.6 mm. In other words, in a current cutoff mechanism having the constitution above, the weld diameter D6 is preferably in a numerical range of 2.43 mm or larger, but smaller than 3.6 mm.

<Action of Current Cutoff Mechanism>

In sealed secondary battery 10 having such a constitution, when the internal pressure of battery case 12 increases, the contact is lost between the current breaking valve (dome 32B of concavity 32) and current collector (thin portion 76) and the conductive path from wound electrode unit 50 to electrode terminal 20 is cut off. Such action is described in detail below.

When sealed secondary battery 10 reaches an overcharged state, the electrolyte solution and/or overcharge additive undergo decomposition, etc., to produce gas inside battery case 12. The internal pressure of the case increased by such production of gas is applied through a gas vent 78A formed in current collector 70 onto current breaking valve 30. More specifically, some stress is applied to concavity 32 of current breaking valve 30 shown in FIG. 3 on the surface inside the battery case 12. When the stress reaches a prescribed value, concavity 32 of current breaking valve 30 is inverted toward the electrode terminal 20 side (toward the outside of battery case 12) and the shape is transformed into the state (inverted state) shown in FIG. 5. Along with the inversion, the thin portion 76 attached to dome 32B of concavity 32 breaks off. This cuts off the conductive path from wound electrode unit 50 to electrode terminal 20.

Figure 5:
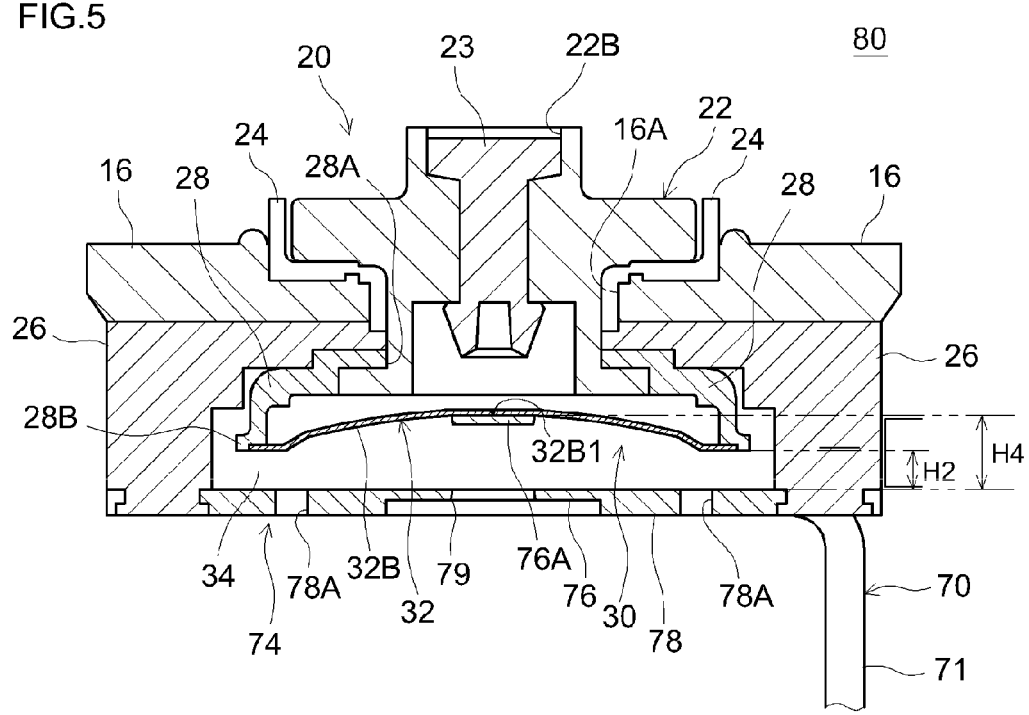
FIG. 5 shows a cross-sectional view schematically illustrating the configuration and state (after interruption of the current) of the current cutoff mechanism provided to the sealed secondary battery according to an embodiment.

When a circular notch 79 is formed in the thin portion 76, the thin portion 76 quickly breaks off at the notch 79. As a result, as shown in FIG. 5, while being attached to the dome 32B, the portion 76A on the inside relative to notch 79 in the thin portion 76 is displaced to the electrode terminal 20 side and is separated from the portion 76B on the outside relative to notch 79. This cuts off the conductive path at a suitable location between current breaking valve 30 and current collector 70.

As shown in FIG. 5, after inversion of current breaking valve 30, the top 32B1 of concavity 32 (dome 32B) is preferably placed on the terminal electrode 20 side relative to flange 34. In other words, after inversion of current breaking valve 30, the height H4 of the top 32B1 of dome 32B and the height H2 of flange 34 preferably satisfy a relationship H4>H2. More specifically, when the height H2 is set to 0.8 mm, the height H4 of the top of the inverted dome 32B is preferably larger than 0.8 mm (e.g. 1.0 mm or larger). This can preferably prevent conduction between the current breaking valve 30 and current collector 70 after inversion of current breaking valve 30. When the height H4 after inversion is larger than 0.8 mm, even if the pressure inside the case decreases after actuation of current cutoff mechanism 80, reversion of current breaking valve 30 to the current collector 70 side can be suitably prevented.

<Production Method for Sealed Secondary Battery>

Referring to drawings, an embodiment of the sealed secondary battery production method disclosed herein is described next.

I. Fastening of Electrode Terminal

In the production method disclosed herein, first, an electrode terminal is fastened to a lid of a battery case. In the present embodiment, a tubular gasket 24 is first inserted in the direction from the outside of battery case 12 into terminal socket 16A in lid 16. Connecting terminal 22 is then inserted into the opening 24A of gasket 24. On the other hand, the connecting terminal 22 protruding in the direction toward the inside of battery case 12 is inserted into holes 26A and 28A formed in insulator 26 and breaking valve holder 28. While keeping this state, a tip 22C of connecting terminal 22 is caulked as shown in FIG. 3. By this, the connecting terminal 22, gasket 24, insulator 26 and breaking valve holder 28 unitedly constituting electrode terminal 20 are fastened to lid 16.

II. Welding of Current Breaking Valve

Subsequently, a current breaking valve welding step is carried out to weld the current breaking valve along the inner circumference of the tubular electrode terminal. In the present embodiment, plate-shaped current breaking valve 30 is fixed along the inner circumference of rim 28B in breaking valve holder 28 and a weld is then formed where it is fixed. This seals the internal space 20A of electrode terminal 20. Examples of the welding method include laser welding, ultrasonic welding and so on.

III. Thermal Caulking

Current collector 70 is then thermally caulked to insulator 26. This fixes the relative locations of the dome 32B of current breaking valve 30 and the thin portion 76 of current collector 70 in a state where the former is pushed against the latter. For instance, as shown in FIG. 8, the thermal caulking can be performed by thermally melting a suitable resin component 1000.

IV. Welding of Current Breaking Valve and Current Collector

Figure 8:
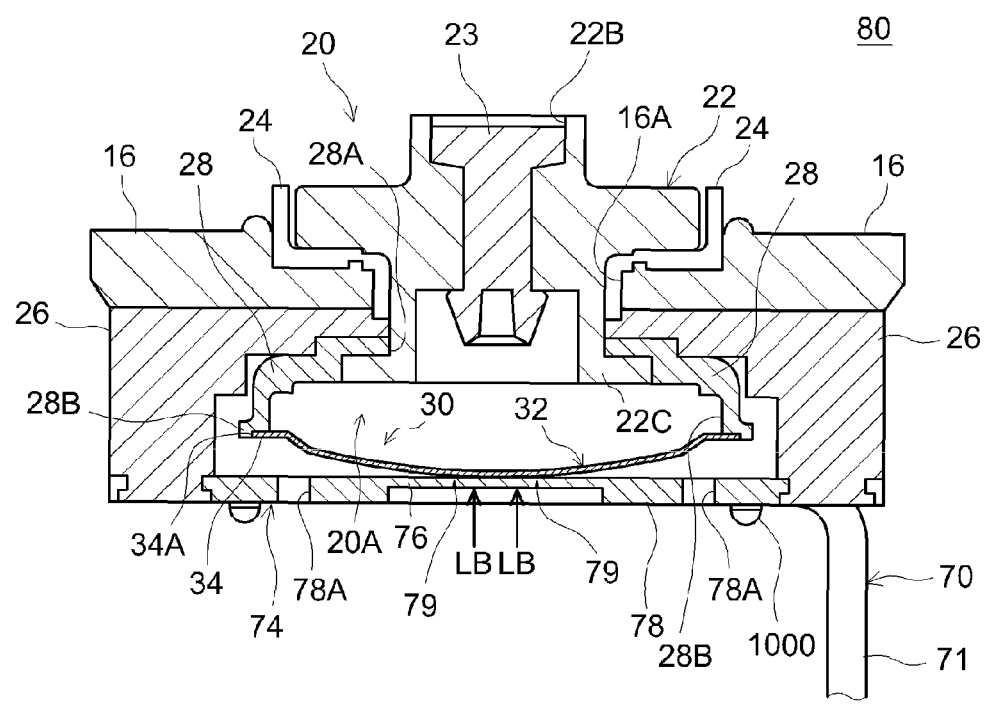
FIG. 8 shows a cross-sectional view descriptive of a production method for the current cutoff mechanism in FIG. 3.

The dome 32B and the thin portion 76 being pushed together as shown in FIG. 8 are then welded. For instance, a laser beam LB is irradiated to a region that is included in the contact area between the dome 32B and thin portion 76 and located on the inside relative to notch 79 to form a circular weld (not drawn). As described above, in the thermal caulking step, the dome 32B and thin portion 76 are allowed to stay in contact while current breaking valve 30 is set to have a suitable shape to ensure a large contact area between the dome 32B and thin portion 76; and therefore, the dome 32B and thin portion 76 can be welded together over a large surface area (e.g. a weld diameter ≥2 mm). This prevents the weld between the dome 32B and thin portion 76 from cracking apart due to external stress or an internal pressure rise that may occur during normal use of the battery, and current cutoff mechanism 80 can be constructed to actuate at a suitable timing.

Certain embodiments of the sealed secondary battery disclosed herein and the production method thereof are described above. In the following, specific worked examples related to the sealed secondary battery disclosed herein are introduced. The description of such worked examples is not intended to limit the present invention to the following examples.

Example 1

Figure 21:
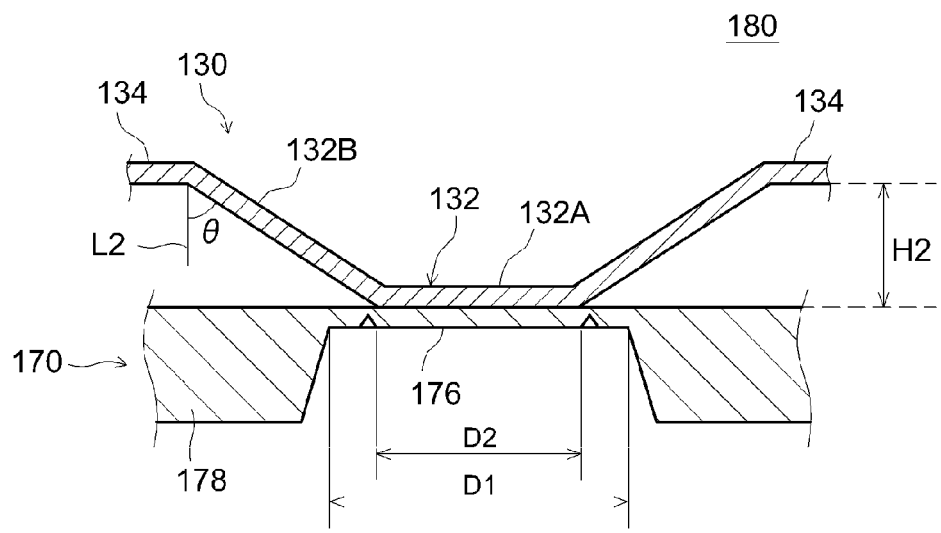
FIG. 21 shows a cross-sectional view of a current cutoff mechanism comprising a current breaking valve having a conical frustum-shaped concavity.
Figure 22:
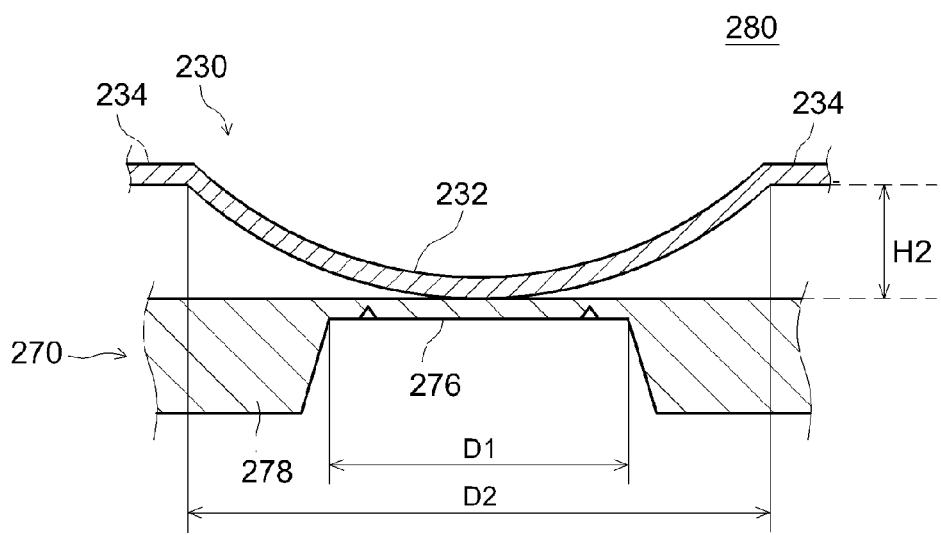
FIG. 22 shows a cross-sectional view of a current cutoff mechanism comprising a current breaking valve having a spherical cap-shaped concavity.

In this example, six current cutoff mechanisms of varied constitutions were obtained. With respect to each current cutoff mechanism, the actuation pressure (inversion pressure) of current breaking valve and the contact area between the current breaking valve and thin portion were studied. Described below are the respective current cutoff mechanisms (Samples 1 to 6). In the present example, the height H2 from the flange's inner circumference to the current collector is set to 0.8 mm in each sample.
(Sample 1)
As shown in FIG. 21, in a current cutoff mechanism 180 of Sample 1, there is formed in a current breaking valve 130 a concavity 132 descending in a conical frustum shape from a flange 134 toward a current collector 170. In current breaking valve 130 thus constituted, a thin portion 176 of current collector 170 has a diameter D1 of 4.5 mm. The top face 132A (the face of conical frustum-shaped concavity 132 in contact with thin portion 176) of concavity 132 has a diameter D2 of 3 mm. The rotation axis L (in FIG. 21, line L2 in parallel with rotation axis L) of the concavity and the sloped side wall of the concavity form an angle θ of 82°.
(Sample 2)
As shown in FIG. 22, in a current cutoff mechanism 280 of Sample 2, there is formed in a current breaking valve 230 a concavity 232 descending in a spherical cap shape from a flange 234 toward a current collector 270. In current breaking valve 230 thus constituted, the diameter D2 of spherical cap-shaped concavity 232 is set to 16 mm. Spherical cap-shaped concavity 232 has a sphere radius R of 38 mm. The diameter D1 of thin portion 276 in Sample 2 is 4.5 mm, the same as Sample 1.
(Sample 3)
As shown in FIG. 23, in a current cutoff mechanism 380 of Sample 3, there is formed in a current breaking valve 330 a concavity 332 constituted with a cylindrical side wall 332A descending perpendicularly from a flange 334 to a current collector 370 and a dome 332B descending in a spherical cap shape from the upper rim of the side wall 332A to current collector 370 (thin portion 376). In current breaking valve 330 thus constituted, the diameter D2 of dome 332B in the concavity is set to 16 mm. The dome 332B in the concavity has a sphere radius R of 101 mm. In addition, the rotation axis L (in FIG. 21, line L2 in parallel with rotation axis L) of concavity 332 and side wall 332A are in parallel (slope angle θ=0°). The diameter D1 of thin portion 376 in Sample 3 is 4.5 mm, the same as Sample 1.
(Sample 4)
As shown in FIG. 24, in a current cutoff mechanism 480 of Sample 4, there is formed in a current breaking valve 430 a concavity 432 constituted with a sloped side wall 432A descending and tapering from a flange 434 to a current collector 470 and a dome 432B descending in a spherical cap shape from the rim of the sloped side wall 432A. In current cutoff mechanism 430 thus constituted, the diameter D2 of dome 432B in the concavity is set to 8 mm. Dome 432B has a sphere radius R of 26 mm. In addition, the concavity's rotation axis L and sloped side wall form a slope angle θ of 79°. The diameter D1 of thin portion 476 in Sample 4 is 4.5 mm, the same as Sample 1.

(Sample 5)
As shown in FIG. 4, in a current cutoff mechanism 80 of Sample 5, there is formed in a current breaking valve 30 a concavity 32 constituted with a tapered, sloped side wall 32A and a spherical cap-shaped dome 32B. In current cutoff mechanism 80 of Sample 5, the slope angle θ of the sloped side wall is set to 68°. The diameter D2 of dome 32B is set to 12 mm and the sphere radius R of dome 32B is set to 59 mm. The diameter D1 of thin portion 76 in Sample 5 is 4.5 mm, the same as Sample 1.
(Sample 6)
In a current cutoff mechanism 80 of Sample 6, similarly to Sample 5, there is also formed in a current breaking valve 30 a concavity 32 constituted with a tapered, sloped side wall 32A and a spherical cap-shaped dome 32B (see FIG. 4). In current cutoff mechanism 80 of Sample 6, the slope angle θ of the sloped side wall is set to 70°. The diameter D2 of dome 32B is set to 12 mm and the sphere radius R of dome 32B is set to 100 mm. The diameter D1 of thin portion 76 in Sample 6 is 4.5 mm, the same as Sample 1.
(Relationship Between Thin Portion's Diameter D1 and Concavity's Diameter D2)
With respect to Samples 1 to 6, studies were made here to determine whether or not the relationship between the thin portion's diameter D1 and concavity's diameter D2 satisfied 2·D1<D2. As a result, as shown in Table 1 below, Samples 2, 3, 5 and 6 satisfied 2·D1<D2.

TABLE 1

| No. | D1 (mm) | D2 (mm) | 2·D1 < D2 | Sphere radius R (mm) | D3 < D4 | Slope angle θ (deg) | Inversion pressure (MPa) | Contact area |
|---|---|---|---|---|---|---|---|---|
| 1 | 4.5 | 3 | x | — | — | 82 | 0.69 | x |
| 2 | 4.5 | 16 | ○ | 38 | x | — | 1.0 | x |
| 3 | 4.5 | 16 | ○ | 101 | ○ | 0 | 0.33 | x |
| 4 | 4.5 | 8 | x | 26 | x | 79 | 0.96 | x |
| 5 | 4.5 | 12 | ○ | 59 | ○ | 68 | 0.62 | ○ |
| 6 | 4.5 | 12 | ○ | 100 | ○ | 70 | 0.52 | ○ |

(Relationship Between Concavity's Diameter D3 and Diameter D4 Across Intersections Between Extrapolated Dome and Flange)
With respect to Samples 2 to 5 having domes, studies were made here to determine whether or not the relationship between the concavity's diameter D3 and diameter D4 across intersections c1 and c2 between an arc R drawn along the surface of dome 32B and flange 34 satisfies D3<D4 (whether or not the outermost rim b1 of sloped side wall 32A is located on the inside in the radial direction relative to an arc R drawn along the curve of dome 32B). As shown in Table 1 above, Samples 3, 5 and 6 satisfied D3<D4.
(Contact Area Between Concavity and Thin Portion)
After the concavity and the thin portion were pushed and welded together, the diameter (mm) of contact area between the concavity and thin portion was measured. The measurement results are shown in Table 1 above. In Table 1, regarding the contact area, the symbol ○ is given for samples whose contact area's diameter D6 was 2 mm or larger while the simple x is given for samples with 2 mm or smaller D6. Samples having contact areas of 2 mm diameter or larger (samples that reserved sufficient contact areas) were Samples 5 and 6. With respect to Sample 3, when the thin portion 276 was pushed onto concavity 32, the concavity 32 and thin portion 76 did not suitably make tight contact to form a proper weld. This is thought to have happened because of the excessively large sphere radius R of concavity 32.

(Actuation Pressure of Current Breaking Valve)

Pressure was applied here to the current breaking valve of each Sample to measure the pressure at which the current breaking valve was inverted to lose the contact with the thin portion (the actuation pressure of current cutoff mechanism, i.e. the inversion pressure of current breaking valve). As shown in Table 1, with respect to Samples 1, 3, 5 and 6, as the current breaking valves inverted at 0.7 MPa or lower pressure, the actuation pressures were kept low. In particular, the current breaking valves according to Samples 3, 5 and 6 showed inversion pressure values as low as or lower than 0.65 MPa.

With respect to Sample 3, although current breaking valve 330 inverted at a significantly low pressure of 0.33 MPa, the side wall 332A perpendicularly standing from flange 334 did not invert and the dome 332B solely inverted ahead. Accordingly, it did not ensure a distance (extent) of inversion enough to assuredly cut off the conduction between current breaking valve 330 and current collector 270.

Summary of Example 1

As described above, among Samples 1 to 6, with respect to Samples 5 and 6, large contact areas were obtained between their concavities and thin portions and their concavities were inverted at low pressures as well. From this, it has been confirmed that in a current breaking valve 30 having a concavity 32 formed of a sloped side wall 32A and a dome 32B, when the slope angle θ of sloped side wall 32A is set to 60°≤θ≤75° and the dome 32B has a sphere radius R of 50 mm or larger, but 100 mm or smaller, a current cutoff mechanism 80 can be constructed to have a large contact area between current breaking valve 30 and current collector 70 and a low actuation pressure.

Example 2

In this example, contact areas and actuation pressures were determined with respect to Sample 7 to 27 in which the slope angles θ of sloped side walls 32A and sphere radii R of domes 32B were varied for current breaking valves 30 having concavities 32 constituted with sloped side walls 32A and domes 32B. The measurement results of each sample's slope angle θ, sphere radius R of dome 32B, contact area and actuation pressure are shown in Table 2 below. The height H2 from flange 34 to current collector 70 is set to 0.8 mm in this example as well. Sample 7 in Table 2 uses a current breaking valve 230 comprising a concavity 232 consisting of a spherical cap-shaped dome while Sample 11 uses a current breaking valve 30 comprising a conical frustum-shaped concavity 132.

TABLE 2

| No. | Sphere radius R (mm) | Dome's diameter D2 (mm) | Dome's height H1 (mm) | Slope Angle θ (deg) | Contact area's diameter D6 (mm) | Inversion pressure (MPa) |
| --- | --- | --- | --- | --- | --- | --- |
| 7 | 38 | 8 | 0.8 | — | — | x |
| 8 | 26 | 4 | 0.31 | 82.65 | 1.4 | x |
| 9 | 40 | 5 | 0.31 | 80.15 | 1.04 | x |
| 10 | 59 | 6 | 0.31 | 74.65 | 2.27 | 0.62 |
| 11 | 101.5 | 7.8 | 0.3 | 0 | 2.1 | x |
| 12 | 97.08 | 7.67 | 0.3 | 15 | 2.1 | x |
| 13 | 93.88 | 7.51 | 0.3 | 30 | 2.08 | x |
| 14 | 88.67 | 7.3 | 0.3 | 45 | 2.08 | x |
| 15 | 79.98 | 6.93 | 0.3 | 60 | 2.08 | 0.43 |
| 16 | 75.29 | 6.73 | 0.3 | 65 | 2.06 | 0.46 |
| 17 | 68.68 | 6.43 | 0.3 | 70 | 2.06 | 0.52 |
| 18 | 58.54 | 5.93 | 0.3 | 75 | 2.06 | 0.62 |
| 19 | 40.92 | 4.96 | 0.3 | 80 | 0.66 | x |
| 20 | 500 | 5.69 | 0.03 | 70 | 0.3 | x |
| 21 | 200 | 5.84 | 0.09 | 70 | 0.24 | x |
| 22 | 100 | 6.12 | 0.19 | 70 | 2.19 | x |
| 23 | 50 | 6.93 | 0.48 | 70 | 1.7 | 0.67 |
| 24 | 40.5 | 7.53 | 0.7 | 70 | 0.9 | x |
| 25 | 43.81 | 7.25 | 0.6 | 70 | 0.66 | x |
| 26 | 48.61 | 6.98 | 0.5 | 70 | 1.96 | 0.67 |
| 27 | 56.03 | 6.7 | 0.4 | 70 | 2.04 | 0.57 |

(Measurement Results of Contact Area and Inversion Pressure)

As shown in Table 2, in current cutoff mechanisms 80 of Samples 10, 15 to 18, 26 and 27, the contact areas had diameters D6 of 1.9 mm or larger while the pressures (inversion pressures) required for inversion of concavities 32 were 0.7 MPa or lower. For all current cutoff mechanisms 80 of these samples, the domes 32B had sphere radii of 45 mm or larger, but smaller than 100 mm while the sloped side walls 32A had slope angles θ of 60°≤θ≤75°. With respect to Samples 10, 15 to 18 and 27 wherein domes 32B had sphere radii R of 50 mm or larger, but smaller than 100 mm, the contact area's diameters D6 showed further preferable values (D6>2.0 mm).

(Relationship Between Slope Angle θ and Inversion Pressure)

Figure 12:
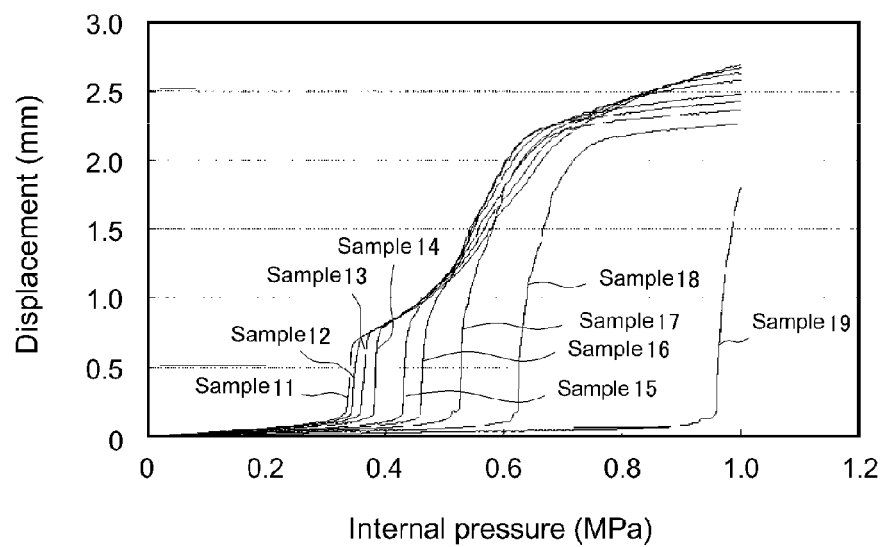
FIG. 12 shows a graph indicating the relationship between the case's internal pressure and the displacement of current breaking valve with respect to current breaking valves having sloped side walls with varied slope angles θ.

Studies were made here about the relationship between the slope angle θ of sloped side wall 32A and the inversion pressure to invert concavity 32 of current breaking valve 30 (actuation pressure of current cutoff mechanism). More specifically, with respect to Samples 11 to 19 having the same dome 32B height H1 (0.3 mm) with varied slope angles θ for sloped side walls 32A, while pressure was applied to their concavities 32, the degree of inversion (extent of inversion (mm)) of current breaking valves 30 was assessed. The results obtained are shown in the graph of FIG. 12. The vertical axis of the graph indicates the extent of inversion (mm) while the horizontal axis indicates the internal pressure MPa applied to concavity 32.

As shown in FIG. 12, with respect to Samples 11 to 14 with slope angles θ of 45° or smaller, the extent of inversion increases significantly at once when the internal pressure was at or below 0.4 MPa and increases gradually from then on. From this, with a sloped side wall 32A having a slope angle θ of 45° or smaller, it is thought that two-staged inversion takes place such that after inversion of dome 32B, sloped side wall 32A undergo gradual inversion. This is thought to happen because a sloped side wall 32A close to perpendicular to flange 34 is significantly more rigid than a dome 32B. This is not preferable since the conduction may continue between sloped side wall 32A and current collector 70 and the action of current cutoff mechanism 80 may become inconsistent.

On the contrary with respect to Samples 32 to 36 with slope angles θ of 60° or larger, the dome 32B and sloped side wall 32A have inverted at once. Accordingly, it is thought that by setting the slope angle θ of sloped side wall 32A to satisfy θ<60°, a current cutoff mechanism 80 can be constructed to produce more consistent actuation.

With respect to Sample 36 with slope angle θ=80°, an internal pressure close to 1.0 MPa was required to invert current breaking valve 30. This is thought to be because with increasing slope angle θ, the shape of the entire concavity 32 assumes a more spherical shape and its rigidity increases greatly.

Based on the above, it has been found that when the slope angle θ of sloped side wall 32A is set to a range of 60°≤θ≤75°, a concavity 32 can be formed to suitably invert at a low pressure.

(Relationship Between Sphere Radius R and Inversion Pressure)

Figure 13:
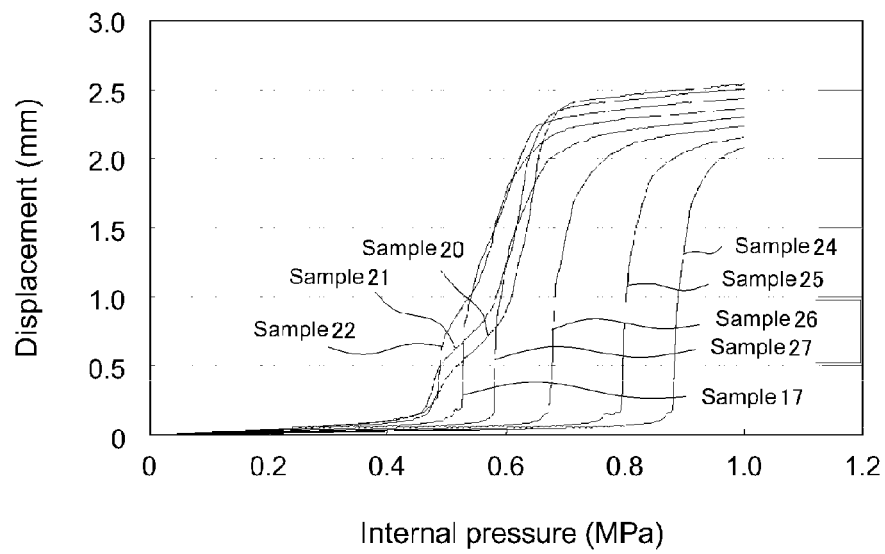
FIG. 13 shows a graph indicating the relationship between the case's internal pressure and the displacement of current breaking valve with respect to current breaking valves having domes with varied heights H1.

Studies were made here about how the sphere radius R of dome 32B affected the actuation pressure of current cutoff mechanism 80. More specifically, with respect to Sample 17 and 20 to 27 having the same slope angle θ (70°) for sloped side walls 32A, but varied sphere radii R for domes 32B, while pressure was applied to their concavities 32, the degree of inversion (extent of inversion (mm)) of current breaking valves 30 relative to the pressure was assessed. The results obtained are shown in the graph of FIG. 13. The vertical axis of the graph indicates the extent of inversion (mm) while the horizontal axis indicates the internal pressure MPa applied to concavity 32.

As shown in FIG. 13, with respect to Samples 20 to 22 with sphere radii R in a range of 500 mm to 100 mm, the change in the extent of inversion upon the internal pressure rise is unstable. This is thought to be because in these samples, the sphere radii R of domes 32B are too large and the shapes of the entire concavities 32 are close to conical frustum shapes, and thus, the tapered, sloped side walls 32A undergo inversion after the inversion of the domes 32B with significantly small heights H1 (smaller than 0.3 mm) in early stages.

On the contrary, with respect to Samples 17 and 23 to 27 with sphere radii R smaller than 100 mm, both the dome 32B and sloped side wall 32A have inverted at once. Accordingly, it is thought that by having a sphere radius R of dome 32B smaller than 100 mm, a current cutoff mechanism 80 can be constructed to produce more consistent actuation.

With respect to Samples 24 and 25 with sphere radii R smaller than 45 mm, pressures of 0.8 MPa or higher were required to invert current breaking valves 30. This is thought to be because a smaller sphere radius R leads to a larger height H1 of dome 32B; the larger height H1 leads to a smaller height H3 of sloped side wall 32A which is included in the concavity 32 height (flange 34 height) H2; and the shape of the entire concavity 32 assumes a more spherical shape, thereby greatly increasing the rigidity of the entire concavity 32.

Based on the above, it has been found that when the sphere radius R of dome 32B is set to a range of 45 mm or larger, but smaller than 100 mm, a concavity 32 can be formed to suitably invert at a low pressure.

The sealed secondary battery disclosed herein is described above. According to the sealed secondary battery disclosed herein, can be provided a high-power sealed secondary battery (typically a lithium-ion secondary battery having a square external shape) comprising an aforementioned current cutoff mechanism and having a large capacity (typically a capacity as large as 5 Ah or greater, e.g. 5 Ah to 20 Ah, or even 20 Ah or greater (e.g. 20 Ah to 30 Ah) in terms of the ampere-hour). A multi-cell battery 100 comprising such sealed secondary batteries 10 as single cells can be provided as well.

Figure 19:
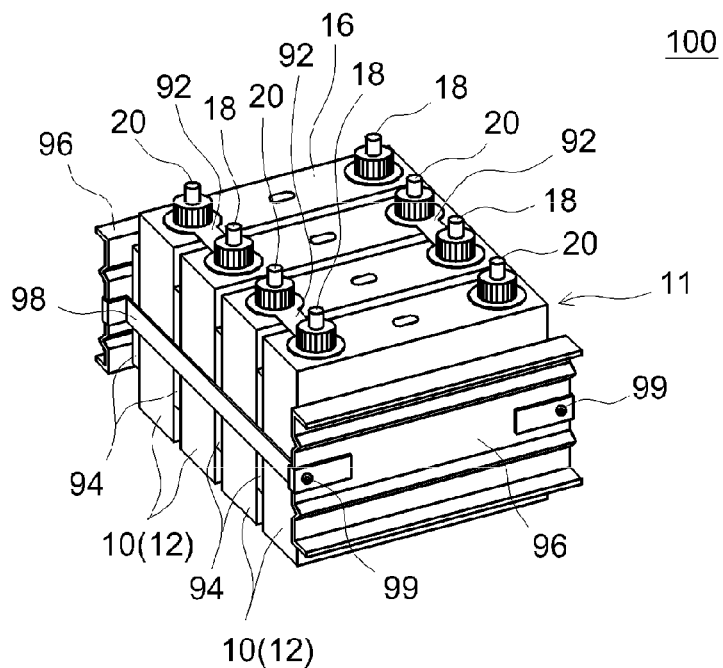
FIG. 19 shows a perspective view illustrating a multi-cell battery according to an embodiment of the present invention.

More specifically, as shown in FIG. 19, with a sealed secondary battery (typically a square lithium secondary battery as shown in the drawing) 10 that comprises a current cutoff mechanism disclosed herein being a single cell, a plurality (four in the embodiment outlined, but not limited to this) of the single cells 10 are arranged to constitute a multi-cell battery 100. Typically, as shown in the drawing, it is constructed such that the respective single cells 10 are electrically connected in series. More specifically, the top face (i.e. sealing plate) 16 of battery case 12 of each single cell 10 is provided with a positive terminal 20 electrically connected to the positive electrode of an electrode unit housed in case 12, and a negative terminal 18 electrically connected to the negative electrode of the electrode unit. Between adjacent single cells 10, positive terminal 20 of one cell and negative terminal 18 of the other cell are electrically connected with a suitable connecting means 92. To the both sides of a group 11 of single cells including the plurality of single cells 10 arranged as described above, end plates 96 are placed, respectively, and to crosslink the pair of end plates 96 and 96, beams 98 are attached along the arranged direction to both the side faces of single cell group 11. The respective ends of beams 98 are fastened tightly on end plates 96 with screws 99. The respective single cells 10 are connected in series like this are restricted (fastened) to construct a multi-cell battery 100 having a desirable voltage, as a power supply to drive a vehicle.

In a preferable embodiment of multi-cell battery 100, as shown in FIG. 18, in between the respective single cells 10 arranged in a prescribed direction, space holding sheets 94 are placed. It is preferable that such space holding sheet 94 is made of a material (e.g. made of a highly heat-conductive metal or made of a lightweight and hard synthetic resin such as polypropylene) and/or has a shape, such that it is capable of serving as a heat-releasing member to release the heat generated inside each single cell 10 when in use.

Figure 20:
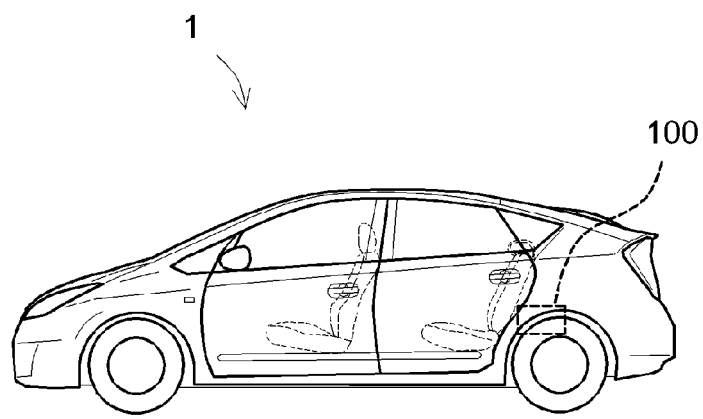
FIG. 20 shows a side view schematically illustrating a vehicle (automobile) comprising a multi-cell battery according to an embodiment of the present invention.

As shown in FIG. 20, this description provides a vehicle 1 (typically an automobile comprising a driving motor, such as an electric automobile, hybrid automobile, plug-in hybrid automobile, fuel cell automobile) comprising the multi-cell battery 100 described above as the driving power supply.

While the present invention has been described in detail above, these embodiments and worked examples are merely for illustrations. The invention disclosed herein includes various modifications and changes made to the specific embodiments illustrated above. The dimensions of the respective members and spaces illustrate some examples of the present invention. Any form proportionally similar to the disclosed dimensions is included in the technical ideas of the present invention and may bring about equivalent effect.

REFERENCE SIGNS LIST

1: vehicle
10: battery
12: battery case
14: main casing
16: lid
18: negative terminal
20: positive terminal (electrode terminal)
22: connecting terminal
23: terminal stopper
24: gasket
26: insulator
28: breaking valve holder
30: current breaking valve
32: concavity 32A: sloped side wall
32B: dome
34: flange
36: spacer
50: wound electrode unit
52: positive electrode
54: separator
55: wound core
70: current collector
71: connector
72: current collector tab
74: current collector plate (current collector)
76: thin portion
78: thick portion
79: notch
80: current cutoff mechanism
100: multi-cell battery
1000: resin component

The invention claimed is:

1. A sealed secondary battery comprising
an electrode unit as a power generator having a positive electrode and a negative electrode,
a battery case housing the electrode unit,
an electrode terminal electrically connected to the electrode unit, and
a current cutoff mechanism that is arranged in a conductive path between the electrode unit and the electrode terminal to cutoff the conductive path when a pressure rise occurs inside the battery case,
with the current cutoff mechanism comprising
a current collector that is a plate-shaped member electrically connected to the electrode unit and has a thin portion formed relatively thinner than its surrounding, and
a current breaking valve that is a plate-shaped member having a ring-shaped flange electrically connected to the electrode terminal and a concavity descending from the flange toward the thin portion, is placed opposite the thin portion of the current collector, and is in contact at the concavity with the thin portion,
wherein, the concavity of the current breaking valve is configured to comprise a sloped side wall which tapers with decreasing diameter from the inner circumference of the ring-shaped flange to the thin portion and further comprise a dome descending in a spherical cap shape from a rim of the sloped side wall toward the thin portion,
an angle $\theta$ between the sloped side wall and a line extending orthogonally from the current corrector and intersecting the inner circumference of the ring-shaped flange satisfies $60° \leq \theta \leq 75°$,
the spherical cap-shaped dome has a sphere radius R of 30 mm or larger, but smaller than 100 mm, and
in a planer view along a rotation axis L of the sloped side wall, the outer circumference of the dome is located outside the outer circumference of the thin portion.

2. The sealed secondary battery according to claim 1, wherein, in a cross section including the top of the spherical cap-shaped dome, the outermost rim of the sloped side wall is located on the inside in the radial direction relative to an arc R drawn along the curve of the spherical cap-shaped dome.

3. The sealed secondary battery according to claim 2, wherein a height H2 from the inner circumference of the flange to the current collector is 0.8±0.05 mm.

4. The sealed secondary battery according to claim 3, wherein a height H1 from the outer circumference of the dome to the current collector is 0.3 mm to 0.5 mm.

5. The sealed secondary battery according to claim 1, wherein the thin portion has a diameter D1 and the dome has a diameter D2, with the diameters D1 and D2 satisfying a relationship $2<D2/D1$.

6. The sealed secondary battery according to claim 5, wherein the thin portion's diameter D1 and the dome's diameter D2 satisfy a relationship $2.6<D2/D1<3.1$.

7. The sealed secondary battery according to claim 1, wherein the spherical cap-shaped dome has a sphere radius R of 45 mm or larger, but smaller than 100 mm.

8. A vehicle battery comprising the sealed secondary battery according to claim 1.

* * * * *